(12) United States Patent
Zhang et al.

(10) Patent No.: US 9,831,781 B2
(45) Date of Patent: Nov. 28, 2017

(54) FAST TRANSIENT POWER SUPPLY WITH A SEPARATED HIGH FREQUENCY AND LOW FREQUENCY PATH SIGNALS

(71) Applicant: LINEAR TECHNOLOGY CORPORATION, Milpitas, CA (US)

(72) Inventors: Henry Jindong Zhang, Fremont, CA (US); Jian Li, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/048,591

(22) Filed: Feb. 19, 2016

(65) Prior Publication Data

US 2016/0248328 A1    Aug. 25, 2016

Related U.S. Application Data

(60) Provisional application No. 62/119,042, filed on Feb. 20, 2015, provisional application No. 62/126,418, filed on Feb. 27, 2015, provisional application No. 62/119,078, filed on Feb. 20, 2015, provisional application No. 62/126,421, filed on Feb. 27, 2015.

(51) Int. Cl.
*H02M 3/158* (2006.01)
*H02M 1/00* (2006.01)
*H02M 3/156* (2006.01)

(52) U.S. Cl.
CPC .. *H02M 3/1584* (2013.01); *H02M 2001/0009* (2013.01); *H02M 2003/1566* (2013.01)

(58) Field of Classification Search
CPC ............... H02M 3/158; H02M 3/1584; H02M 2001/0009; H02M 2003/1566
See application file for complete search history.

(56) References Cited

U.S. PATENT DOCUMENTS

| | | | |
|---|---|---|---|
| 5,929,692 A | 7/1999 | Carsten | |
| 6,984,969 B1 | 1/2006 | Liu et al. | |
| 7,233,130 B1 | 6/2007 | Kay | |
| 7,609,040 B1 * | 10/2009 | Jain | H02M 3/157 323/276 |
| 8,917,077 B2 | 12/2014 | Lin et al. | |

(Continued)

OTHER PUBLICATIONS

A. Barrado et al.,"The Fast Response Double Buck DC-DC Converter (FRDB): Operation and Output Filter Influence," IEEE Transactions on Power Electronics, vol. 20, No. 6, Nov. 2005.

(Continued)

*Primary Examiner* — Jue Zhang
(74) *Attorney, Agent, or Firm* — McDermott Will & Emery LLP

(57) ABSTRACT

A power interface device includes a main switching converter, an auxiliary switching converter, and a feedback sense circuit. The main switching converter is coupled to an input terminal and an output terminal and configured to operate at a first switching frequency to source a low frequency current from the input terminal to the output terminal. The auxiliary switching converter is coupled to the input terminal and the output terminal in parallel with the main switching converter and configured to operate at a second and higher switching frequency than the first switching frequency to source a fast transient high frequency current from the input terminal to the output terminal.

20 Claims, 12 Drawing Sheets

(56) References Cited

U.S. PATENT DOCUMENTS

| | | | |
|---|---|---|---|
| 2002/0036486 A1 | 3/2002 | Zhou et al. | |
| 2009/0044031 A1* | 2/2009 | Vinayak | G06F 1/26 |
| | | | 713/300 |
| 2009/0201000 A1* | 8/2009 | Kojima | H02M 3/1588 |
| | | | 323/282 |
| 2014/0184177 A1 | 7/2014 | Tournatory et al. | |

OTHER PUBLICATIONS

Official Letter dated Jul. 10, 2017 issued in Taiwan Patent Application No. 105105003 (with English language translation).

\* cited by examiner

FAST TRANSIENT POWER SUPPLY WITH A SEPARATED HIGH FREQUENCY AND LOW FREQUENCY PATH SIGNALS

CROSS REFERENCE TO RELATED APPLICATIONS

This application claims the benefit of priority from U.S. Provisional Application Ser. No. 62/119,042, filed Feb. 20, 2015, and entitled "FAST TRANSIENT POWER SUPPLY WITH A FIRST CONTROL SIGNAL FOR A HIGHER FREQUENCY CURRENT AND A SECOND CONTROL SIGNAL FOR A LOWER FREQUENCY CURRENT," U.S. Provisional Application Ser. No. 62/126,418, filed Feb. 27, 2015, and entitled "FAST TRANSIENT POWER SUPPLY WITH A FIRST CONTROL SIGNAL FOR A HIGHER FREQUENCY CURRENT AND A SECOND CONTROL SIGNAL FOR A LOWER FREQUENCY CURRENT," U.S. Provisional Application Ser. No. 62/119,078, filed Feb. 20, 2015, and entitled "CONTROL ARCHITECTURE WITH IMPROVED TRANSIENT RESPONSE," and U.S. Provisional Application Ser. No. 62/126,421, filed Feb. 27, 2015, and entitled "CONTROL ARCHITECTURE WITH IMPROVED TRANSIENT RESPONSE," which are incorporated by reference herein in their entirety.

BACKGROUND

A power supply system includes a power source, a load device, and a power interface device coupled to the electrical power source and the load device. The power source may include a battery, a power grid, a solar photovoltaic cell, an AC generator, and/or an output of front-end power converter. The power interface device may be configured to increase or decrease the voltage of the power source to provide a suitable voltage for the load device. The power interface device may be a boost converter or a buck converter or any other converter. The load device may include a resistive load, a magnetic load, a capacitive load, a heater. In one implementation, the load device may be a low voltage but a high current load device such as, for example, computer central processing unit (CPU). This type of load device may have many load transient conditions.

During a load transient condition, the current of the load device may substantially change within a very short time period. For example, during the transient condition, the current of the load device may increase from 0 A to 100 A, or decrease from 100 A to 0 A, in less than one microsecond. These sudden changes in current can create large voltage variation at the load device and can cause the output voltage to swing outside of the regulated operating window of the load device.

To minimize transient variations, in one implementation, a large power capacitor may be added to the output of the power supply system. The capacitor may source or sink the necessary current during the transient condition and therefore reduce voltage variation caused by the load transient. To this end, the output capacitor is useful in supplementing the inductor's slowly rising current to meet the increase in current demand from the load device. Similarly, the output capacitor is useful in sinking the current to meet the sudden decrease in current from the load device. Capacitors, however, are expensive and as such may increase cost or size of the system.

In another implementation, the converter may be pushed to run at higher bandwidth to respond to a load transient quickly. However, a switching mode converter bandwidth is limited by its switching frequency. Therefore, to push the converter to run at the higher bandwidth, the converter has to operate at higher switching frequency. This means more power loss because each time there is a turn on/off of the switch, there is a power loss. As such, the power supply system is also limited by the power loss of the power converter placed between the power source and the load device.

Hence, a need exists for a power supply system capable of providing a fast response to the transient condition of the load device while increasing the efficiency and reducing costs and size.

SUMMARY

In one general aspect, the instant application describes a power interface device that includes a main switching converter, an auxiliary switching converter, and a feedback sense circuit. The main switching converter is coupled to an input terminal and an output terminal and configured to operate at a first switching frequency to source a low frequency current from the input terminal to the output terminal. The auxiliary switching converter is coupled to the input terminal and the output terminal in parallel with the main switching converter and configured to operate at a second and higher switching frequency than the first switching frequency to source a fast transient high frequency current from the input terminal to the output terminal. The feedback sense circuit is configured to sense an output voltage at the output terminal. The power interface device also includes an error amplifier, a high pass filter, and an auxiliary driver circuit. The error amplifier circuit is configured to receive the sensed output voltage and a reference voltage and output a transient signal based on the sensed output voltage and the reference voltage. The high pass filter is configured to receive the transient signal and output a higher frequency component of the transient signal. The auxiliary driver circuit is configured to drive the auxiliary switching converter based on the higher frequency component of the transient signal.

The above general aspect may include one or more of the following features. The main switching converter and the auxiliary switching converter may include current-mode switching regulators. The main switching converter and the auxiliary switching converter may include step-down, current mode, switching regulators configured to convert a higher input voltage of the input terminal to a lower voltage, the lower voltage being the output voltage. The main switching converter may include a first main switch, a second main switch, and a main inductor. The first main switch at one end may be coupled to the input voltage terminal and at another end may be coupled to a main node. The second main switch at one end may be coupled to the main node and at another end may be coupled to a ground terminal. The main inductor at one end may be coupled to the main node and at another end may be coupled to the output terminal.

The auxiliary switching converter may include a first auxiliary switch, a second auxiliary switch, and an auxiliary inductor. The first auxiliary switch at one end may be coupled to the input terminal and at another end may be coupled to an auxiliary node. The second auxiliary switch at one end may be coupled to the auxiliary node and another end may be coupled to the ground terminal. The auxiliary inductor at one end may be coupled to the auxiliary node and at another end may be coupled to the output terminal.

The auxiliary switching regulator may be configured to source the fast transient high frequency current only during a transient detected at a load device. The transient may include a sudden increase or decrease in load current. The first and second main switches and the first and second auxiliary switches may include FET switches.

The feedback sense circuit may include a plurality of resistors and capacitors configured to sense the output voltage and generate a feedback voltage. The error amplifier may be configured to receive the feedback voltage and the reference voltage and generate the transient signal when the feedback voltage and the reference voltage are not substantially equal to each other.

The power interface device may further include a low pass filter configured to receive the transient signal and output a lower frequency component of the transient signal; and a main driver circuit configured to drive the main switching converter based on the lower frequency component of the transient signal. The auxiliary driver circuit may include an auxiliary comparator configured to compare the higher frequency component of the transient signal with a sensed high frequency current sourced by the auxiliary switching converter and generate an auxiliary pulse-width signal for driving the auxiliary switching converter. The auxiliary pulse-width signal may enable the auxiliary switching converter to source high frequency current tracking the higher frequency component of the transient signal to the output terminal.

The main driver circuit may include a main comparator circuit configured to compare the lower frequency component of the transient signal with a sensed low frequency current sourced by the main switching converter and generate a main pulse-width signal for driving the main switching converter. The main pulse-width signal may enable the main switching converter to source the low frequency current tracking the lower frequency component of the transient signal to the output terminal.

In response to the first duty-cycle, the auxiliary switching converter may be configured to source the fast transient high frequency current to the output terminal only during a transient sensed at a load device via the feedback sense circuit. The auxiliary switching converter may be configured to source substantially zero current during a steady-state operation of the load device.

In another general aspect, the instant application describes a power interface device that includes a main switching converter coupled to an input terminal and an output terminal and configured to operate at a first switching frequency to source a low frequency current from the input terminal to the output terminal and an auxiliary switching converter coupled to the input terminal and the output terminal in parallel with the main switching converter and configured to operate at a second and higher switching frequency than the first switching frequency to source a fast transient high frequency current from the input terminal to the output terminal. The power interface device also includes a main control loop configured to drive the main switching converter to source the low frequency current from the input terminal to the output terminal and an auxiliary control loop being independent form the main control loop and configured to drive the auxiliary switching converter to source the fast transient high frequency current from the input terminal to the output terminal during a transient. The auxiliary control loop includes a high pass filter configured to output a higher frequency compensation component of an output voltage associated with the transient. The auxiliary control loop is configured to drive the auxiliary switching converter based on the higher frequency compensation component of the output voltage.

The above general aspect may include one or more of the following features. The main control loop may include a main feedback sense circuit having a plurality of resistors and capacitors configured to sense the output voltage and generate a feedback voltage and a main error operational amplifier configured to receive the feedback voltage and a reference voltage and generate a transient signal when the feedback voltage and the reference voltage are not substantially equal to each other. The main control loop may also include a main comparator circuit configured to compare the transient signal with a sensed low frequency current sourced by the main switching converter and generate a main pulse-width signal for driving the main switching converter. The main pulse-width signal may enable the main switching converter to source the low frequency current tracking the transient signal.

The auxiliary control loop may include an auxiliary feedback sense circuit having a low pass filter coupled to the output terminal and configured to generate a lower frequency compensation component of the output voltage, an auxiliary error operational amplifier configured to directly receive the output voltage and the lower frequency compensation component of the output voltage, generate the higher frequency compensation component of the output voltage, and supply the higher frequency compensation component of the output voltage to the high pass filter. The auxiliary control loop may also include an auxiliary comparator circuit configured to compare the higher frequency compensation component of the output voltage with a sensed high frequency current sourced by the auxiliary switching converter and generate an auxiliary pulse-width signal for driving the auxiliary switching converter. The auxiliary pulse-width signal may enable the auxiliary switching converter to source the fast transient high frequency current tracking the higher frequency component of the output voltage to the output terminal.

In another general aspect, the instant application describes a power interface device including a main switching converter coupled to an input terminal and an output terminal and configured to operate at a first switching frequency to source a low frequency current from the input terminal to the output terminal and an auxiliary switching converter coupled to the input terminal and the output terminal in parallel with the main switching converter and configured to operate at a second and higher switching frequency than the first switching frequency to source a fast transient high frequency current from the input terminal to the output terminal. The power interface device also includes a feedback sense circuit configured to sense an output voltage at the output terminal; an error amplifier configured to receive the sensed output voltage and a reference voltage and output a transient signal based on the sensed output voltage and the reference voltage; a low pass filter configured to receive the transient signal and output a lower frequency component of the transient signal; a high pass filter configured to receive the transient signal and output a higher frequency component of the transient signal; a main driver circuit configured to drive the auxiliary switching converter based on the lower frequency component of the transient signal; and an auxiliary driver circuit configured to drive the auxiliary switching converter based on the higher frequency component of the transient signal.

The above general aspect may include one or more of the following features. The main switching converter and the auxiliary switching converter may include step-down, current mode, switching regulators configured to convert a higher input voltage of the input terminal to a lower voltage, the lower voltage being the output voltage. The main switching converter may include a first main switch, a second main switch, and a main inductor. The first main switch at one end may be coupled to the input voltage terminal and at another end may be coupled to a main node. The second main switch at one end may be coupled to the main node and at another end may be coupled to a ground terminal. The main inductor at one end may be coupled to the main node and at another end may be coupled to the output terminal.

The auxiliary switching converter may include a first auxiliary switch, a second auxiliary switch, and an auxiliary inductor. The first auxiliary switch at one end may be coupled to the input terminal and at another end may be coupled to an auxiliary node. The second auxiliary switch at one end may be coupled to the auxiliary node and another end may be coupled to the ground terminal. The auxiliary inductor at one end may be coupled to the auxiliary node and at another end may be coupled to the output terminal.

BRIEF DESCRIPTION OF DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuit have been described at a relatively high-level, without detail, in order to avoid unnecessarily obscuring aspects of the present teachings.

There is a continuing search for a power supply system having a fast response to a transient condition at a load device with an improved efficiency while reducing solution size and cost and increasing supply power density. The load device may have different power requirements. This naturally means the power supply system may have to run as efficient as possible both to reduce size and to reduce input power to save energy and increase efficiency. To this end, the power supply system may include a main switching converter and an auxiliary switching converter running in parallel with each other. The main switching converter may run at a first switching frequency and the auxiliary switching converter may run at a second switching frequency. The second switching frequency may be higher than the first switching frequency. Therefore, the main switching converter may have a higher efficiency (e.g., less power switching loss) than that of the auxiliary switching converter. In contrast, the auxiliary switching converter may have a better transient performance (e.g., a faster transient response) in response to a transient at the load device than that of the main switching converter. Since the auxiliary switching converter may have a higher switching loss than that of the main switching converter, the auxiliary switching converter may not be utilized to provide the main low frequency power to the load device during steady-state operation. Instead, the auxiliary switching converter may only be used to deal with the transients to sink or source additional current with sudden increase or decrease in the load current.

Figure 1:
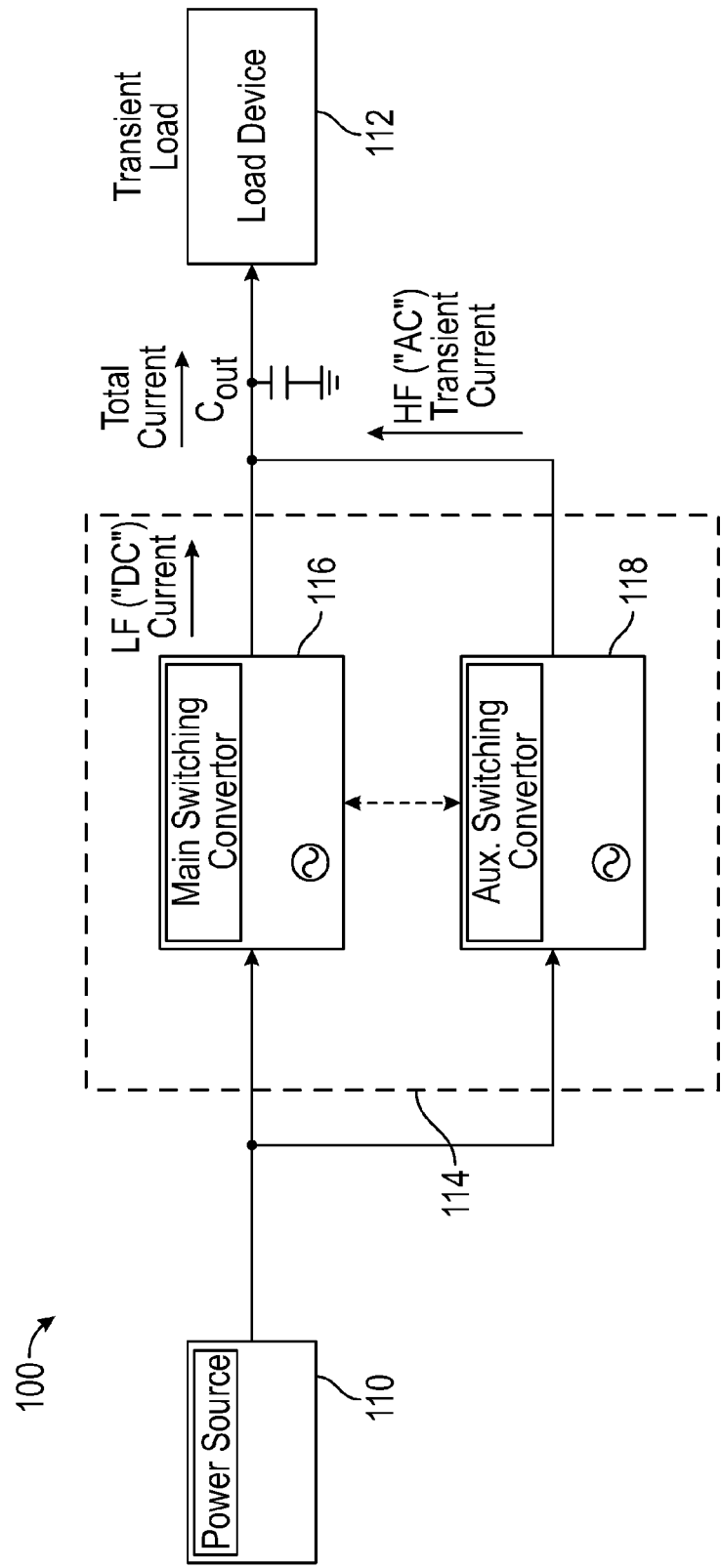
FIG. 1 illustrates an exemplary power supply system configured to have a fast transient response and a high efficiency.

FIG. 1 illustrates an exemplary power supply system 100 configured to have a fast transient response and a high efficiency. The power supply system 100 includes a power source 110, a load device 112, and a power interface device 114 coupled to the electrical power source 110 and the load device 112. The power source 110 is configured to output a certain standard voltage. To this end, the power source 110 may be an electrical outlet. Most single phase alternating-current electrical outlets in the world supply power at 210-240 V or at 100-120 V. Alternatively, the power source 110 may include other types of power sources such as, for example, a battery, a solar photovoltaic, an AC generator, or a DC output voltage of a front-end power supply. Regardless of the type of the power source 110, usually the power source 110 provides a voltage different than the required voltage for the load device 112. The provided voltage may be higher or lower than the required voltage for the load device 112. To match the source voltage to the load voltage, the power supply system 100 includes the power interface 114.

The power interface device 114 is configured to change the voltage of the electrical power source 110 to an appropriate voltage for the load device 112. As noted above, the appropriate voltage for the load device 112 may be higher or lower than the voltage of the electrical power source 110. In one implementation, the appropriate voltage for the load device 112 is lower than the voltage of the electrical power source 110. In one specific example, the power interface device 114 is configured to reduce the voltage of the electrical power source 110 from 12 volts to 1 volt for the load device 112.

The load device 112 may include a resistive load, a magnetic load, a capacitive load, a heater, or modern electronic devices. Most modern electronic devices require between 0.5 and 24 volts DC. These devices can work either from batteries or mains. In either case, the power interface device 114 may be used to match the voltage requirements of these electronic devices with the voltage provided from the power source 110. The power interface device 114 may be internal to the load device 112 or may be external to the load device 112. Similarly, the power interface device 114 may be internal to the power source 110 or may be external to the power source 110.

The power interface device 114 may include a transformer, a rectifier, or switched-mode power supplies. The switched-mode power supplies have become widespread and are smaller and lighter because of their good efficiency and high switching frequency. Additionally, because switched-mode power supplies are typically rectified to operate at a DC voltage, they are minimally affected by the frequency of the mains (50 vs 60 Hz). The foregoing description assumes that power interface device 114 includes switched-mode power supplies; however, as noted above, the power interface device 114 may include circuits other than the switched-mode power supplies.

The power interface device 114 includes two switched-mode power converters, a main switching converter 116 and an auxiliary switching converter 118. The main switching converter 116 may run in parallel to the auxiliary switching converter 118 and at a lower switching frequency (fsw) for good efficiency and to source a lower frequency current to the load device 112. The auxiliary switching converter 118 may run at a higher switching frequency (fsw) to source fast transient higher frequency current to the load device 112. Due to the higher switching frequency (fsw), the auxiliary switching converter 118 may be less efficient or otherwise have more power loss than the main switching converter 116. Therefore, the auxiliary switching converter 118 may not be used to handle the main low frequency power to the load device 112. To this end, the low frequency current of the auxiliary switching converter 118 should be minimized for good efficiency and low thermal stress. Instead, the auxiliary switching converter 118 may be used only to deal with the transients of the load device 112 to sink or source additional current with sudden increase or decrease in the load current.

The power supply system 100 may have smaller size or be more efficient than the previously discussed power supply system using only capacitors or running only the main converter at a higher frequency. The power supply system 100 can reduce the size of the capacitor needed on the output and as a result reduce supply size, PCB area and costs.

Figure 2A:
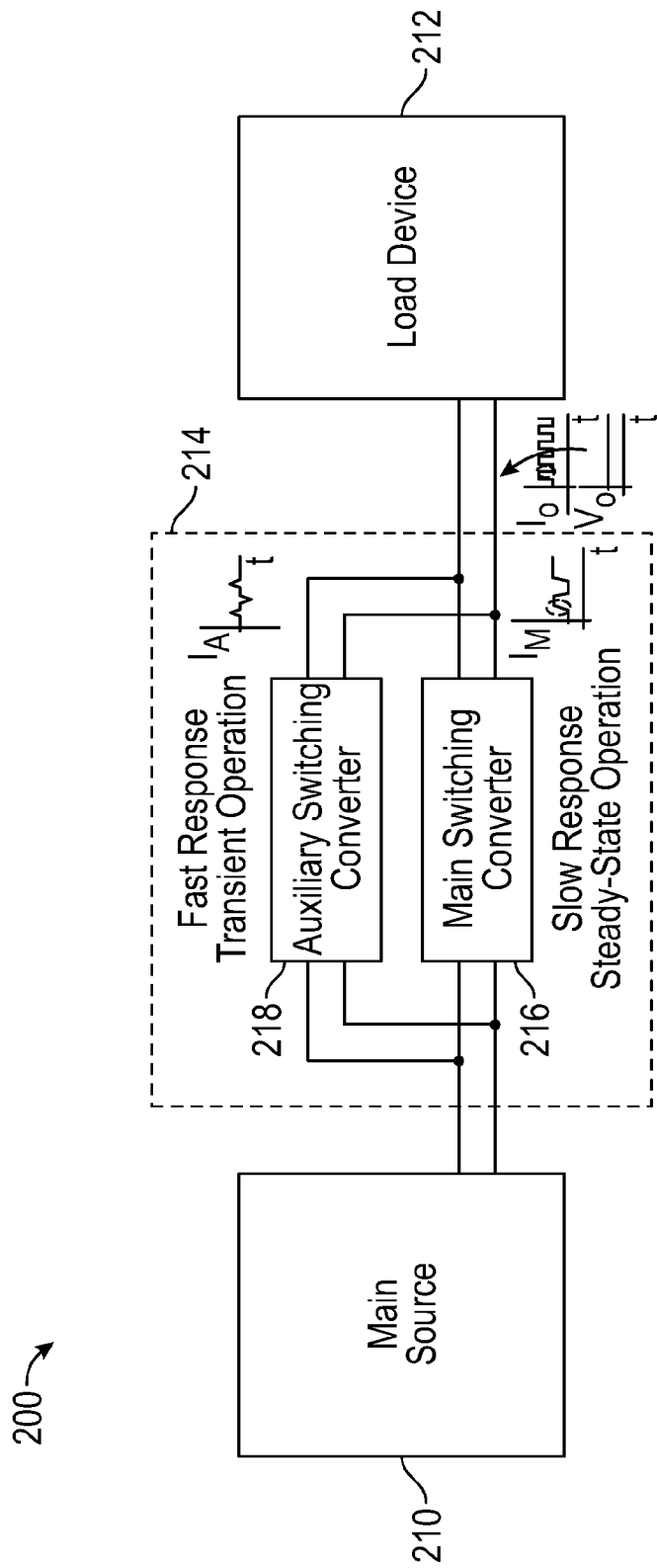
FIGS. 2A and 2B illustrate an exemplary power supply system configured to include an auxiliary switching converter to run in parallel to the main switching converter to deal with the transient conditions of the load device.
Figure 2B:
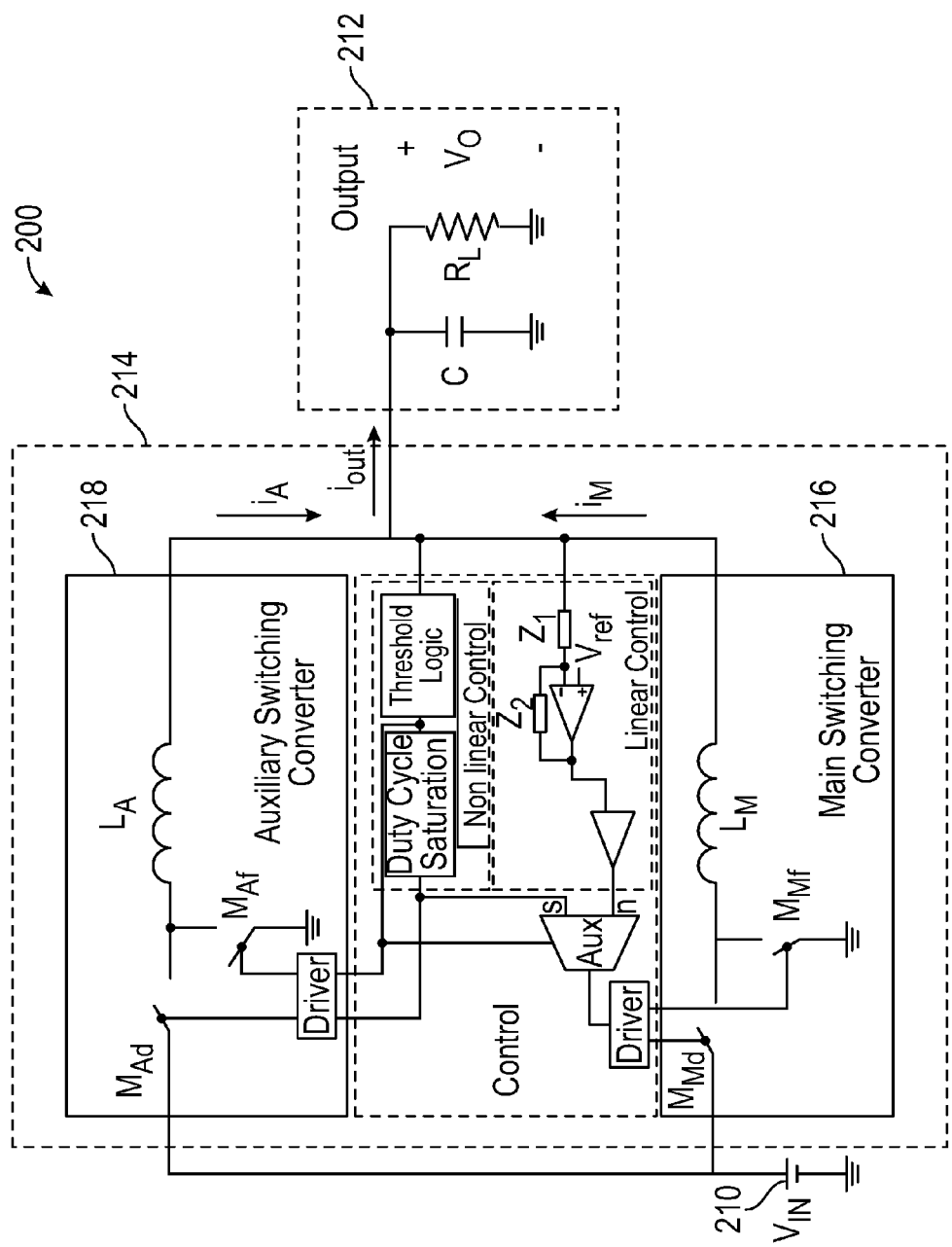

FIGS. 2A and 2B illustrate an exemplary power supply system 200 configured to include an auxiliary switching converter to run in parallel to the main switching converter to deal with the transients of the load device. The power supply system 200 includes a power source 210, a load device 212, and a power interface device 214 coupled to the power source 210 and the load device 212. The power source 210 and the load device 212 may be the same as the power source 110 and the load device 112 described with respect to FIG. 1 and therefore they are not described in detail for brevity.

Similar to the power interface device 114, the power interface device 214 includes a main switching converter 216 and an auxiliary switching converter 218. The main switching converter 216 may include a slower switching frequency (fsw) than that of the auxiliary switching converter 218 and may be designed to work in steady-state operation. To this end, the main switching converter 216 may have good stability and low output voltage ripple, but consequently slow response to the transients at the load device 212. In contrast, the auxiliary switching converter 218 may be configured to source or sink current to or from the output terminal only during the transients. The main aim of the auxiliary switching converter 218 may be to provide a fast transient response by either sinking or sourcing current to address decrease or increase of the load current. The power supply system 200 is described in more detail in an IEEE publication, titled "The Fast Response Double Buck DC-DC Converter (FRDB): Operation and Output Filter Influence" by Andres Barrado Vol. 20, No. 6, November 2005, the content of which is incorporated herein by reference in its entirety.

FIG. 2B illustrates the exemplary components of the power supply system 200 in more detail. As shown, two buck topologies are used to implement the main switching converter 216 and the auxiliary switching converter 218, and a resistive load is used for the load device 212. The power supply system 200 may use a window comparator to detect if Vout is outside of a regulation window. If so, the power supply system 200 turns on the auxiliary switching converter 218 to speed up transient response. If not, the power supply system 200 turns off the auxiliary switching converter 218 or maintains the auxiliary switching converter 218 in the off condition. Although the power supply system 200 provides faster transient response, the power supply system 200 requires an accurate window comparator, which is difficult to accomplish in practical applications if its Vout window needs to be tight and it can be possibly falsely triggered by Vout noise/ripple. Additionally, non-linear control may cause large auxiliary inductor current overshoot/undershoot and ringing.

Figure 3A:
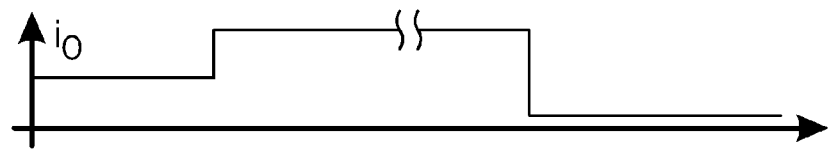
FIGS. 3(A)-3(E) illustrate exemplary waveforms associated with the power supply system shown in FIGS. 2A-2B.
Figure 3B:
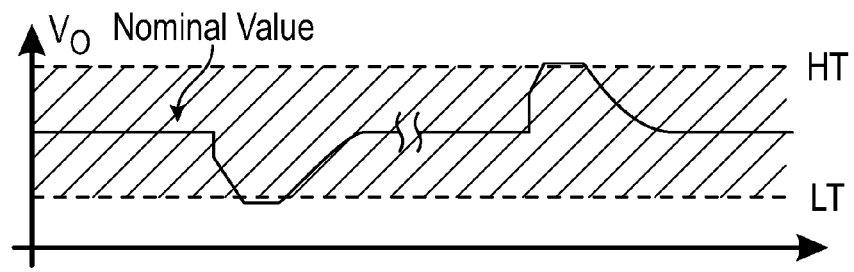
Figure 3C:
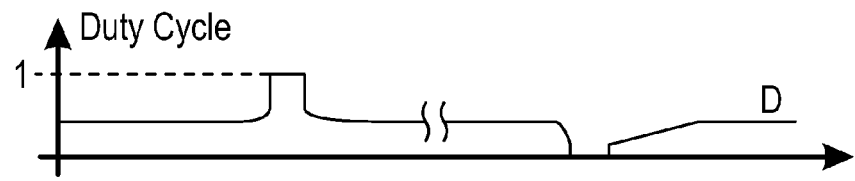
Figure 3D:
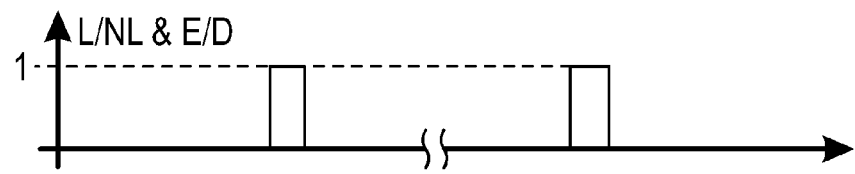
Figure 3E:
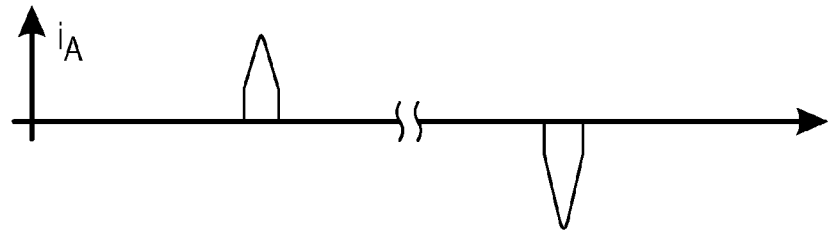

FIGS. 3(A)-3(E) illustrate exemplary waveforms associated with the power supply system 200 shown in FIGS. 2A-2B. Specifically, FIG. 3(A) illustrates a current load step in the load device 212 of the power supply system 200. FIG. 3(B) illustrates output voltage of the power supply 200 in response to the current load step of FIG. 3(A). As shown, in response to the load step of FIG. 3A, the voltage of capacitor reduces to supplement the inductor's slowly rising current to meet the increase in current demand from the load device 212. Similarly, the output capacitor is useful in sinking the current to meet the sudden decrease in current from the load device 212. FIG. 3(C) illustrates duty cycle of the auxiliary switching converter 218. As shown, once the output voltage falls outside of the regulation window, the auxiliary switching converter 218 is enabled to either source or sink current to the output with sudden increase or decrease in the load current. FIG. 3(D) illustrates L/NL & E/D signal for selecting between the auxiliary switching converter and the main switching converter. As shown, when the voltage falls outside of the regulation window, the L/NL & E/D signal enables the auxiliary switching converter 218 to either source or sink current to the output with sudden increase or decrease in the load current. FIG. 3(E) illustrates sourced or sunk current by the auxiliary switching converter 218 in response to sudden increase or decrease in the load current.

Figure 4:
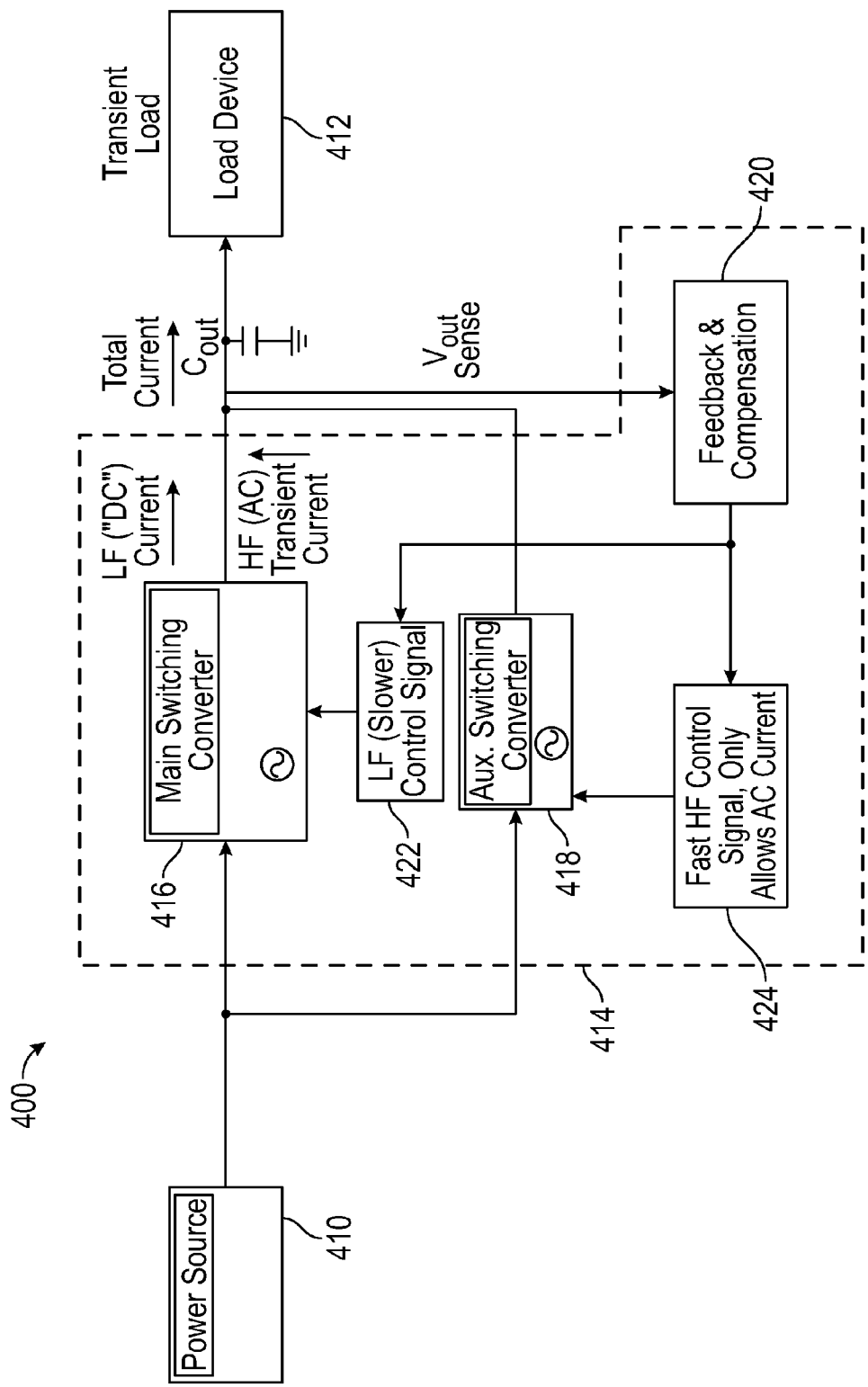
FIG. 4 illustrates an exemplary power supply system including two separate control signals for driving the main switching converter and the auxiliary switching converter.

FIG. 4 illustrates an exemplary power supply system 400 including two separate control signals for driving the main switching converter and the auxiliary switching converter. The power supply system 400 does not use non-linear control with Vout transient detection as shown in FIG. 2. Instead, a linear control is used so it is easy to design and optimize the power supply system 400. The power supply system 400 also does not need an additional power capacitor for separating the high frequency current from the low frequency current for driving the auxiliary switching converter. This can reduce the size and costs of the power supply system 400.

The power supply system 400 includes a power source 410, a load device 412 and a power interface device 414 coupled to the power source 410 and the load device 412. The power source 410 and the load device 412 are similar to the power source 110 and the load device 112. Therefore, for the sake of clarity and brevity of description, they are not described in more detail. The power interface device 414 includes a main switching converter 416, an auxiliary switching converter 418, a feedback and compensation circuit 420, a low frequency control signal driving circuit 422, and a high frequency control signal driving circuit 424.

The main switching converter 416 is connected in parallel with the auxiliary switching converter 418. The main switching converter 416 may be configured to source or sink only a low frequency current. To this end, the main switching converter 416 may be switching at a low frequency to maintain high efficiency of the main switching converter 416. The auxiliary switching converter 418 may be configured to source or sink only a high frequency current. To this end, the auxiliary switching converter 418 may be switching at a high frequency to achieve high loop bandwidth and track high frequency transient. In steady-state, the auxiliary switching converter 418 provides near zero load current and has low power loss, as such power loss is limited in time to the duration of the transient condition at the load device 412.

The power interface device 414 also includes the feedback and compensation circuit 420. The feedback and compensation circuit 420 is connected at one end to the output terminal and at the other end to the low frequency driving circuit 422 and the high frequency driving circuit 424. The feedback and compensation circuit 420 is configured to detect transients at the load device 412, generate a transient signal and control the switches in the main switching converter 416 and the auxiliary switching converter 418 based on the transient signal to provide a stable Vout as quickly as possible.

The transient may include a scenario in which there is a sudden increase or decrease in the load current or voltage. To illustrate one example, during a 25 A current load step at the output, the transient may correspond to the beginning of the load step, where there is a sudden increase in the load current before reaching a first steady-state level at the increased level of 25 A. Similarly, the transient may correspond to the ending of the load step where there is a sudden decrease in the load current before reaching a second steady-state level. The second steady-state may correspond to a state prior to the 25 A current load step or to a new state higher or lower than the state prior to the 25 A current load step.

The transient signal is provided to the low frequency control driving circuit 422 and the high frequency control driving circuit 424. The transient signal includes a lower frequency component and a higher frequency component. The low frequency control driving circuit 422 is configured to separate the lower frequency component of the transient signal from the higher frequency component of the transient signal and drive the main switching converter 416 based on the lower frequency component to respond to the transient condition. The high frequency driving circuit 424 is configured to separate the higher frequency component of the transient signal from the lower frequency component of the transient signal and drive the auxiliary switching converter 418 based on the higher frequency component to respond to the transient condition.

During the transient, both the main switching converter 416 and the auxiliary switching converter 418 are operating to provide a stable Vout as quickly as possible. For example, if there is a sudden increase in the load current due to a positive load step (e.g., from 0 A to 100 A), the main switching converter 416 and the auxiliary switching converter 418 operate to source current to the output. Due to its higher switching frequency and higher loop bandwidth, the auxiliary switching converter 418 may be configured to source current faster to the load device 412 from the power source 410 than the main switching converter 416. The sourced current from the auxiliary switching converter 418 may track the higher frequency component of the transient signal. As such, the sourced current from the auxiliary switching converter 418 is present only during the transient and not during the steady-state operation. That is, once the transient ends (e.g., in the steady-state), the auxiliary switching converter 718 source near zero load current. In keeping with the previous example, the sourced current from the auxiliary switching converter 418 is present when there is a sudden change in the load current from 0 A to 100 A and not during the steady-state period where the load current remains at 100 A before falling back to 0 A or to some other level.

In contrast, the sourced current from the main switching converter 416 may track the lower frequency component of the transient signal and also track the lower frequency current in the steady state. To this end, the sourced current from the main switching converter 416 is present not only during the transient but also during the steady-state operation. In keeping with the previous example, the sourced current from the main switching converter 416 tracks the lower frequency component of the transient signal to slowly rise to reach 100 A and is maintained at 100 A until the load step terminates.

For another example, if there is a sudden decrease in the load current, the main switching converter 416 and the auxiliary switching converter 418 operate to sink current from the output to the ground. Again, due to its higher switching frequency and higher loop bandwidth, the auxiliary switching converter 418 may be configured to sink current from the load device 412 faster than the main switching converter 416. Furthermore, the auxiliary switching converter 418 may be controlled by the driver 424 to sink current that tracks the higher frequency component of the transient signal. As such, the current is sunk only during the transient and not during the steady-state operation. In keeping with the previous example, the sunk current from the auxiliary switching converter 418 is present when there is a sudden change in the load current from 100 A to 0 A and not during the steady-state period where the load current remains at 0 A or some other level. In contrast, the main switching converter 416 may be controlled by the driver 422 to sink current that tracks the lower frequency component of the transient signal. In keeping with the previous example, the main switching converter 416 may slowly sink current from the output until the load current reaches a new threshold level. In keeping with the previous example, the new threshold level may be 0 A.

After the termination of the transient, the power interface device 414 may return to its normal operation. In its normal operation, the main switching converter 416 may source a low frequency current to the output at a level corresponding to the level prior to the load step or to a new level after the load step. However, after the termination of the load step, the auxiliary switching converter 418 may not source or sink additional DC current to the output to maintain high efficiency.

To prevent lower frequency component of the transient signal from entering the auxiliary switching converter 424, the high frequency control driving circuit 424 may employ a high pass filter. The high pass filter is configured to filter out the lower frequency component of the transient signal and allow the higher frequency component of the transient signal to activate or drive the auxiliary switching converter 418. Similarly, to prevent the higher frequency component of the transient signal from entering the main switching converter 416, the low frequency control driving circuit 422 may employ a low pass filter. The low pass filter is configured to filter out the higher frequency component of the transient signal and allow the lower frequency current to activate or drive the main switching converter 416.

Figure 5:
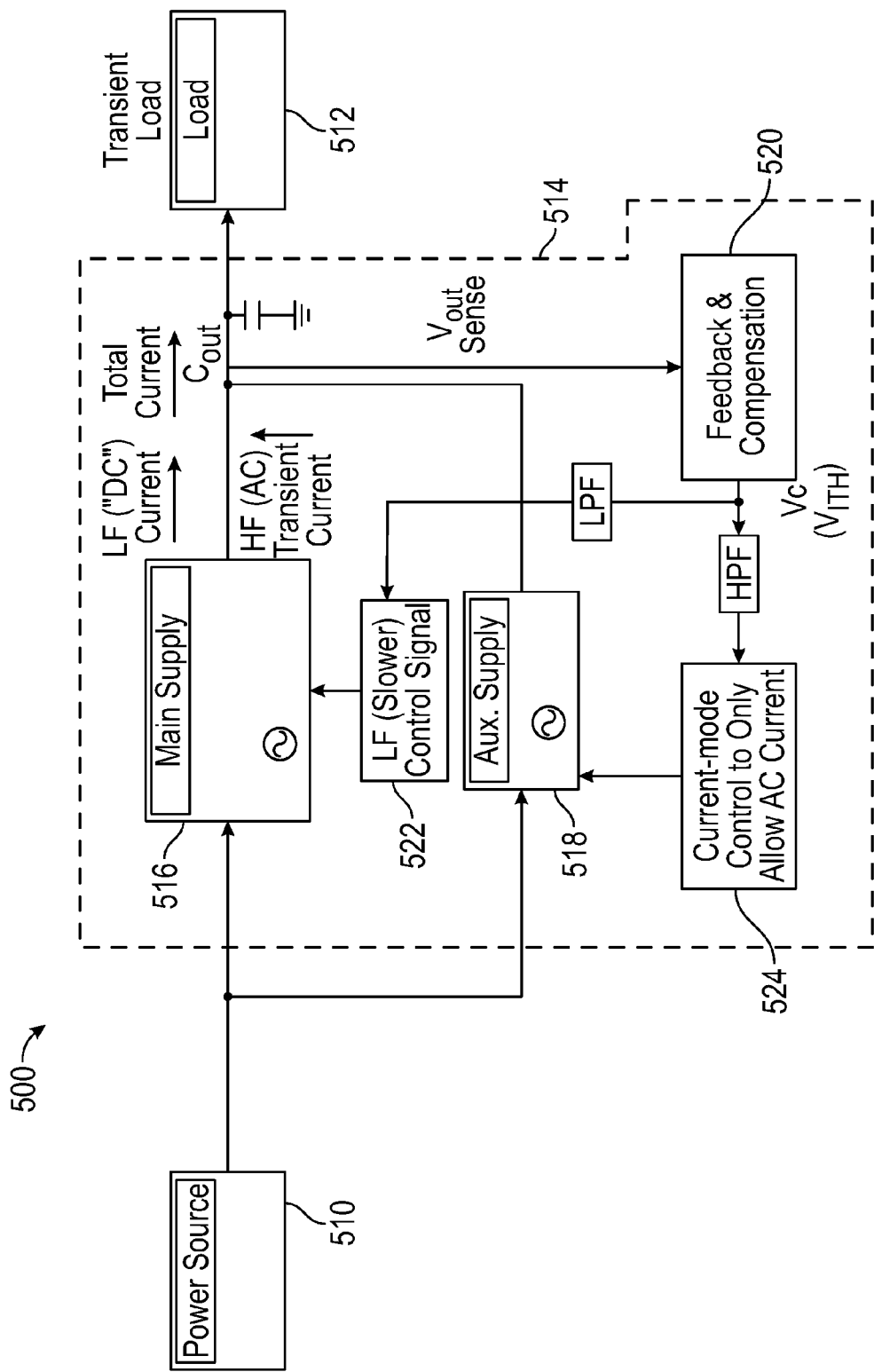
FIG. 5 illustrates another exemplary power supply system including two separate control signals for driving the main switching converter and the auxiliary switching converter.

FIG. 5 illustrates another exemplary power supply system 500 including two separate control signals for driving the main switching converter and the auxiliary switching converter. The power supply system 500 is similar to the power supply system 400 with the exception the low pass filter ("LPF") and the high pass filter ("HPF") are shown to be included inside the power interface device 514 but outside the low frequency control driving circuit 522 and high frequency control driving circuit 524, respectively.

Figure 6:
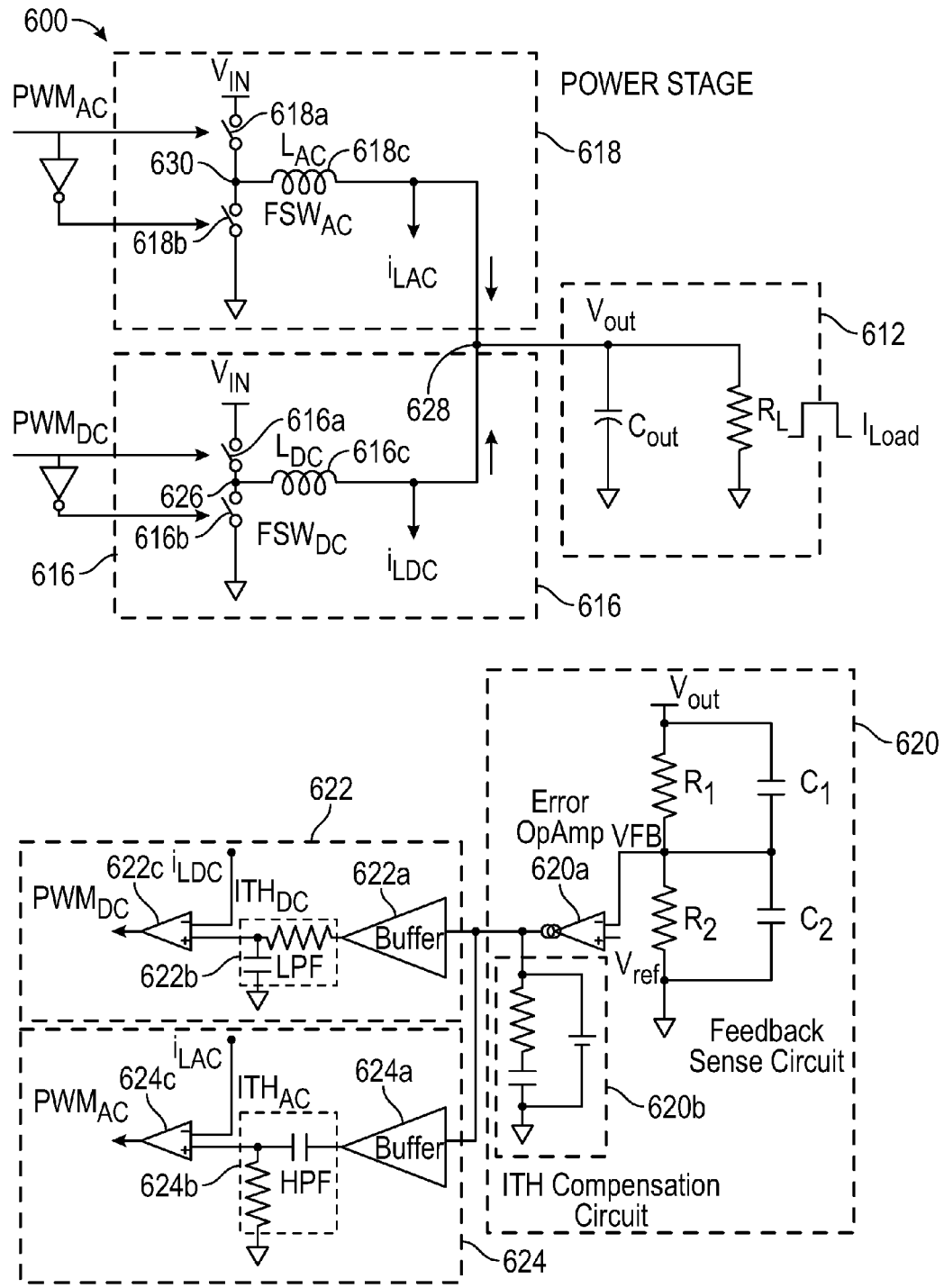
FIG. 6 illustrates an exemplary circuit implementation of the power supply system shown in FIG. 4 having a fast transient response.

FIG. 6 illustrates an exemplary circuit implementation 600 of the power supply system 400 shown in FIG. 4 having a fast transient response. As shown, the power interface of the circuit implementation 600 includes a multiple phase switching regulators 616, 618 connected in parallel with each other, a feedback and compensation mechanism 620, and driver circuits 622, 624.

The main switching converter 616 corresponds to the main switching converter 416 and the auxiliary switching converter 618 corresponds to the auxiliary switching converter 618. The main switching converter 616 and the auxiliary switching converter 618 can be classified as pulse-width-modulation (PWM) type. The PWM produce a pulse train having a fixed frequency variable pulse width. The main switching converter 616 is configured to run at a lower switching frequency fsw than that of the auxiliary switching regulator 618. The auxiliary switching regulator 618 is configured to run at a higher frequency than that of the main switching regulator 616 to quickly respond to the transients at the load device 612. Although the specific example shows two switching regulators 616 and 618, the power interface device 600 may include more than two switching regulators. The regulator 616 can have two or more phases. Similarly, the regulator 618 can have two or more phases. To this end, the instant application is not limited to a single switching regulator 616 and a single switching regulator 618. Any number of such regulators may be connected in parallel with each other.

The switching regulators 616 and 618 may be current-mode switching regulators that include an inductor. The switching regulators 616 and 618 may be synchronous switching regulators but they also may be non-synchronous switching regulators. In one specific example, the switching regulators 616 and 618 may be a step-down, current mode, switching regulator in which the input voltage Vin is greater than the output voltage Vout.

The main switching regulator 616 may include a first switch 616a, a second switch 616b, and an inductor 616c. The first switch 616a and the second switch 616b may be power FET switches. The power FET switches may be n-channel FET or p-channel FET switches. Similarly, the auxiliary switching regulator 618 may include a first switch 618a, a second switch 618b, and an inductor 618c. The first switch 618a and the second switch 618b may be power FET switches. The FET switches may be n-channel FET or p-channel FET switches. Although FET type switches are described, other appropriate technologies may also be used.

In the main switching regulator 616, the first switch 616a may be connected at one end to the Vin and at another end to a first node 626. The second switch 616b may be connected at one end to the first node 626 and at the other end to the ground terminal. The inductor 616c may be connected at one end to the first node 626 and at the other end to the output terminal 628. The output terminal 628 may be connected to the output capacitor Cout and the load resistance $R_L$.

In the auxiliary switching regulator 618, the first switch 618a may be connected at one end to Vin and at another end to a first node 630. The second switch 618b may be connected at one end to the first node 630 and at the other end to the ground terminal. The inductor 618c may be connected at one end to the first node 630 and at the other end to the output terminal 628.

The power interface device 600 is configured to source or sink output current to the load device 612 coupled to the output terminal 628 at a regulated voltage Vout. To this end, the first switch 616a and the second switch 616b in the main switching regulator 616 are switched ON and OFF by a first driver circuit 622. The switches 616a and 616b may be driven out of phase with respect to each other to source or sink current to the load device 612 coupled to output terminal 628. Similarly, the first switch 618a and the second switch 618b in the auxiliary switching regulator 618 are switched ON and OFF by a second driver circuit 624. The switches 618a and 618b may be driven out of phase with respect to each other to source or sink current to the load device 612 coupled to output terminal 628.

The switches 616a and 616b are configured to run at a first switching frequency. The switches 618a and 618b are configured to run at a second switching frequency. The second switching frequency may be higher than the first switching frequency to respond to the transients at the load device 612 more quickly. That is, due to the faster switching frequency, the auxiliary switching converter 618 is configured to source or sink current to or from the load device 612 more quickly than the main switching converter 616. Due to the higher frequency, the auxiliary switching converter 618 has more power loss than the main switching converter 616. To reduce the power loss of the power interface device 600, therefore, the operation of the auxiliary switching converter 618 may be limited to the transient conditions experienced by the load device 612. That is, the auxiliary switching converter 618 may only source or sink current during the transients and may provide zero load current during the steady-state operation.

Although not shown, additional circuit may be added to the power interface device 600 to provide a brief dead-time or blanking interval between the moment that one switching transistor turns OFF and the moment that the other switching transistor turns ON. When the switches 616a, 618a are ON and the switches 616b, 618b are OFF, current flows from the Vin to the output terminal 628 through the inductors 616c, 618c in each of the single phase switching regulators 616 and 618. In this scenario, the rate of change of inductor current 616c and 618c over time may be equal to (Vin−Vout)/L. When the switches 616a, 618a are OFF and the switches 616b, 618b are ON, current flows from the ground terminal to output terminal 628 though the inductors 616c and 618c. In this scenario, the rate of change of inductor currents 616c and 618c over time may be equal to −Vout/L. In each of the above-described scenarios, the total current at the output terminal may be the cumulative inductor currents through inductors 616c and 618c.

The power interface device 600 also includes a feedback and compensation mechanism 620. The feedback and compensation mechanism 620 is connected at one end to the output terminal 628 and at the other end to the driver circuits 622, 624 for driving the single phase switching regulators 616 and 618. The feedback and compensation mechanism 620 is configured to detect transient conditions and control the switches in the single phase switching regulators 616 and 618 to provide a stable Vout as quickly as possible. To this end, the feedback and compensation mechanism 620 includes a feedback voltage sense circuit, an error amplifier 620a, and a compensation circuit 620b.

The feedback voltage sense circuit is configured to sense the Vout through a network of resistors and capacitors including R1, R2, C1, and C2. The network of resistors R1 and R2 form a resistor divider and scale the signal Vout to make it proportional to Vref. The optional capacitors C1 and C2 are provided to make the divider frequency dependent. This frequency dependent divided Vout may be referred to as feedback voltage Vfb. The feedback voltage Vfb and a reference voltage Vref are provided as input to the error amplifier gm (shown as a trans-conductance (gm) amplifier) 620a. The error amplifier 620a may be either a current-output type transconductance amplifier or voltage-output type amplifier.

The error amplifier 620a monitors the feedback voltage Vfb that is proportional to Vout at its inverting input and a reference voltage Vref at its non-inverting input. The feedback voltage Vfb should be approximately equal to the reference voltage Vref. When these two voltages are not equal, the amplifier 620a may provide a transient voltage control signal at its output. The output voltage of the amplifier 620a may correspond to the difference between the actual output voltage and the desired output voltage. The output voltage of the amplifier 620a is inverse to the feedback voltage Vfb. As the feedback voltage Vfb decreases, the output voltage of the amplifier 620a increases. As the feedback voltage Vfb increases, the output voltage of amplifier 620a decreases. The frequency compensation circuit 620b includes capacitors and resistors to provide frequency compensation for the feedback loop. In the current-mode supply system, instead of voltage, the amplifier 620a may provide transient current control signal at its output. In either case, the transient control signal (current or voltage) controls the total output current of converters 616 and 618.

The first driver circuit 622 includes a buffer 622a, a low pass filter 622b, and a comparator 622c. The buffer 622a may be configured to provide electrical impedance transformation from the feedback and compensation mechanism 620 to the first driver circuit 622. The buffer 622a may be a voltage buffer or a current buffer. The low pass filter 622b blocks the higher frequency component $ITH_{AC}$ of the transient control signal ITH and allows the lower frequency component $ITH_{DC}$ of the transient control signal ITH to pass through. The lower frequency component $ITH_{DC}$ is provided to the non-inverting terminal of the comparator 622c and compared with the sensed current $i_{LDC}$ in the inductor 616c (low frequency inductor current) to generate the PWM signal for power FETs 616a and 616b.

If the lower frequency component $ITH_{DC}$ is more than the sensed inductor current signal $i_{LDC}$, the comparator 622c may output a first PWM signal. The first PWM signal may be a high signal to turn ON the high switch 616a and turn OFF the low switch 616b to enable the main switching converter 616 to source additional current to the output terminal 628 with the increased load current. At the beginning of the clock cycle, the switch 616a may turn ON and remain ON until the new current threshold due to the transient is reached. During the time the switch 616a is ON, the low frequency current flows from the power source Vin through the switch 616a and inductor 616c to the output terminal 628. As a result, the current ramps up in the inductor 616c toward a new current threshold. In this manner, the main switching converter 616 sources low frequency current tracking the lower frequency component $ITH_{DC}$ to reach the new current threshold set by the transient. In one implementation, during the transient, the switch 616a may remain ON and the switch 616b may remain OFF until the new current threshold set by the transient is reached. To this end, the fixed switching frequency of the main switching converter 616 may not be maintained during the transient if the on-time for the switch 616a is longer than the cycle time T, for example.

In one implementation, the first driver circuit 622 may activate only one switching regulator 616 to source the necessary current to the output terminal 628. Although not shown, in another implementation, the first driver circuit 622 may activate more than one switching regulators 616 to source the necessary current to the output terminal 628.

If the lower frequency component $ITH_{DC}$ is less than the sensed inductor current signal $i_{LDC}$, the comparator 622c may output a second PWM signal. The second PWM signal is a low signal configured to turn OFF the first switch 616a and to turn ON the second switch 616b. The second PWM signal may enable the main switching converter 616 to sink current from the output terminal 628 with the decreased load current. In response to the second PWM signal, at the beginning of the clock cycle, the switch 616a may turn OFF and the switch 616b may turn ON until the new current threshold set by the transient is reached. During the on-time of the switch 616b, the current ramps down in the inductor 616c toward a new current threshold. In this manner, the main switching converter 616 sinks low frequency current tracking the lower frequency component $ITH_{DC}$ to reach the new current threshold set by the transient. In one implementation, during the transient, the switch 616a may remain OFF and the switch 616b may remain ON until the new current threshold set by the transient is reached. To this end, the fixed switching frequency of the main switching converter 616 may not be maintained during the transient if the on-time for the switch 616b is longer than the cycle time T, for example.

Once the transient ends (e.g., the new current threshold is reached), the main switching converter 616 continues to source and/or sink current to maintain the stability of Vout in accordance with its fixed switching frequency and a duty cycle. The duty-cycle may be determined based on the ratio of output voltage to the input voltage and may be set to maintain the fixed frequency of the switches 616a, 616b. The on-time and the off-time of switches 616a and 616b are determined based on the duty-cycle. In one specific example, the duty-cycle may correspond to the duty-cycle set prior to the transient. To this end, the main switching converter 616 is configured to source and/or sink current both during the transient and steady-state operation.

As noted above, the total output transient control signal ITH of the amplifier 620b is also passed to the second driver circuit 624. The second driver circuit 624 includes a buffer 624a, a high pass filter 624b, and a comparator 624c. The buffer 624a may be configured to provide electrical impedance transformation from the feedback and compensation mechanism 620 to the second driver circuit 624. The buffer 624a may be a voltage buffer or a current buffer. The high pass filter 624b blocks the lower frequency component ITH$_{DC}$ and allows the higher frequency component ITH$_{AC}$ of the transient control signal ITH to pass through. The higher frequency component ITH$_{AC}$ is provided to the non-inverting terminal of the comparator 624c and compared with the sensed current i$_{LAC}$ in the inductor 618c (high frequency inductor current).

If the higher frequency component ITH$_{AC}$ is more than the sensed inductor current signal i$_{LAC}$, the comparator 624c may output the first PWM signal. In keeping with the previous example, the first PWM signal may be a high signal to turn ON the high switch 618a and turn OFF the low switch 618b to enable the auxiliary switching converter 618 to source additional current to the output terminal 628 with the increased load current. In response to the first PWM signal and at the beginning of the clock cycle, the switch 618a may turn ON and remain ON until the new current threshold set by the transient is reached. During the time the switch 618a is ON, the high frequency current flows from the power source Vin through the switch 618a and inductor 618c to the output terminal 628. As a result, the current ramps up in the inductor 618c toward a new current threshold. In this manner, the auxiliary switching converter 618 sources high frequency current tracking the higher frequency component ITH$_{AC}$ to reach the new current threshold. The sourced high frequency current is short lived and is only present during the transient and not during the steady-state operation. During the steady-state operation, the auxiliary switching converter 618 may source zero current to the load.

If the higher frequency component ITH$_{AC}$ is less than the sensed inductor current signal i$_{LAC}$, the comparator 624c may output the second PWM signal. The second PWM signal is the low signal configured to turn OFF the first switch 618a and to turn ON the second switch 618b. In response to the second PWM signal, at the beginning of the clock cycle, the switch 618a may turn OFF and the switch 618b may turn ON. The switch 618b remain ON until the new current threshold set by the transient is reached. During the off-time of the switch 618a and the on-time of the switch 618b, the current ramps down in the inductor 618c toward a new current threshold. In this manner, the auxiliary switching converter 618 sinks high frequency current tracking the higher frequency component ITH$_{AC}$ to reach the new current threshold. In one implementation, during the transient, the switch 618a may remain OFF and the switch 618b may remain ON until the new current threshold set by the transient is reached. To this end, the fixed switching frequency of the auxiliary switching converter 618 may not be maintained during the transient if the on-time for the switch 618b is longer than the cycle time T, for example.

The PWM signals from the first driver circuit 622 and the second driver circuit 624 may be provided to a control circuit which controls the operation of the main switching converter 616 and the auxiliary switching converter 618. The control circuit uses the PWM signal of the driver circuit 622 along with a system clock signal to control the state of switches 616a and 616b of the main switching converter 616. Similarly, the control circuit uses the PWM signal of the driver circuit 624 along with the system clock signal to control the state of switches 618a and 618b of the auxiliary switching converter 618.

If the regulator 616 is a peak-current mode regulator, first its low-side switch 616b may be turned OFF and then its high-side switch 616a may be turned ON by internal clock, thereby increasing the current i$_{LDC}$ of the inductor 616c. Similarly, if the regulator 618 is a peak-current mode regulator, first its low-side switch 618b may be turned OFF and then its high-side switch 618a may be turned ON by internal clock, thereby increasing the current i$_{LAC}$ of the inductor 618c.

If the regulator 616 is a valley-current mode regulator, first the high-side switch 616a is turned OFF and then the low-side switch 616b is turned ON by internal clock or timer, thereby decreasing the current i$_{LDC}$ of the inductor 616c. Similarly, if the regulator 618 is a valley-current mode regulator, first the high-side switch 618a is turned OFF and then the low-side switch 618b is turned ON by internal clock or timer, thereby decreasing the current i$_{LAC}$ of the inductor 618c.

Although a single high side switch 616a and a low side switch 616b are shown in the main switching converter 616, other implementations are possible. For example, the number of high side switches may be two or more. Similarly, the number of low side switches may be two or more. To this end, the control circuit may simultaneously enable more than one high side switch depending on the signal from the driver circuit 622. Similarly, the control circuit may simultaneously enable more than one low side switch depending on the signal from the driver circuit 622.

Figure 7:
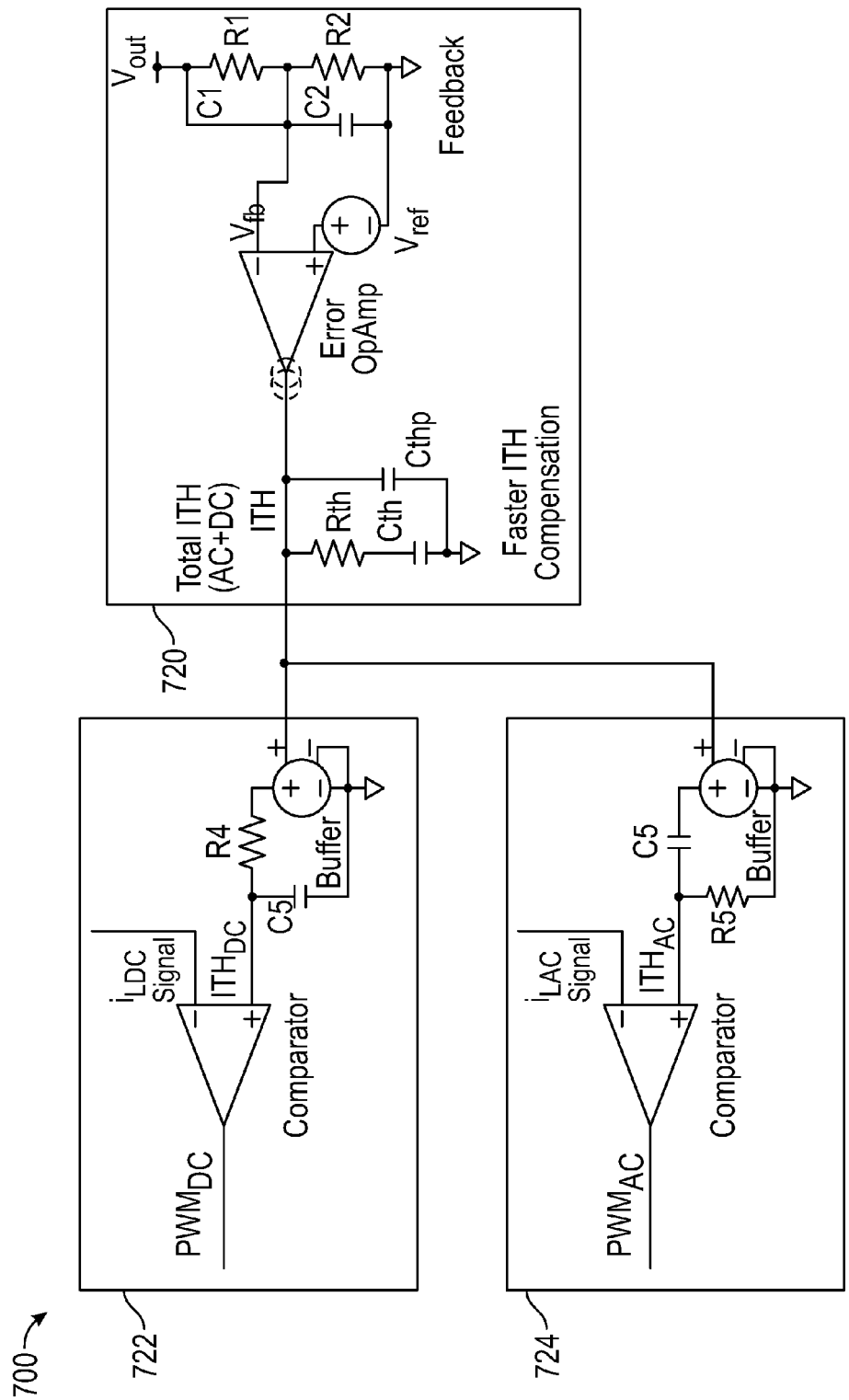
FIG. 7 illustrates an exemplary simulation circuit for the control loop of the power supply system shown in FIG. 6.

FIG. 7 illustrates an exemplary simulation circuit 700 for the control of the power supply system 600 shown in FIG. 6. The simulation circuit 700 includes a feedback and compensation mechanism 720, a first driver circuit 722, and a second driver circuit 724. The feedback and compensation mechanism 720 corresponds to the feedback and compensation mechanism 620; the first driver circuit 722 corresponds to the first driver circuit 622; and the second driver circuit 724 corresponds to the second driver circuit 624. Therefore, they are not described further for brevity.

Figure 8A:
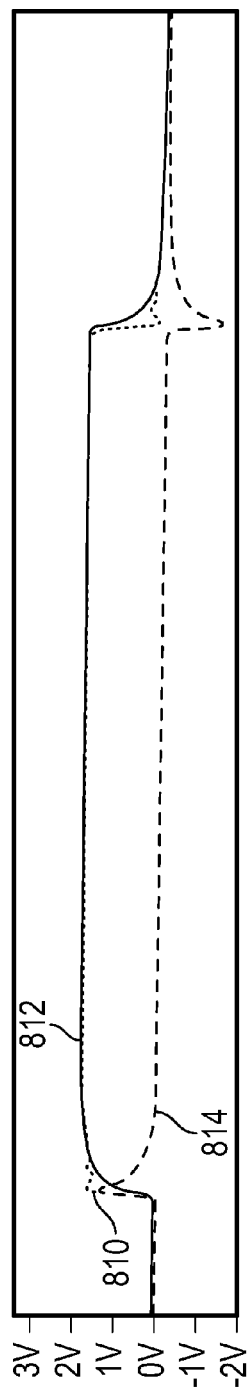
FIGS. 8A-8C illustrate exemplary load transient simulation waveforms for the simulation circuit shown in FIG. 7.
Figure 8B:
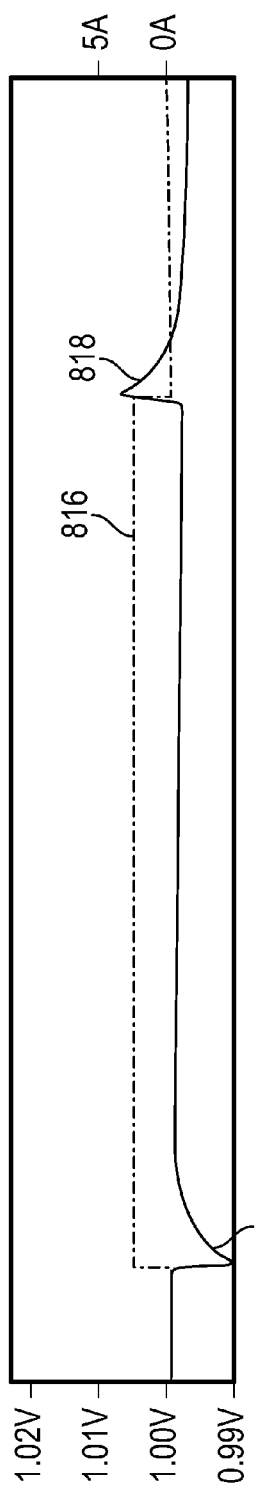
Figure 8C:
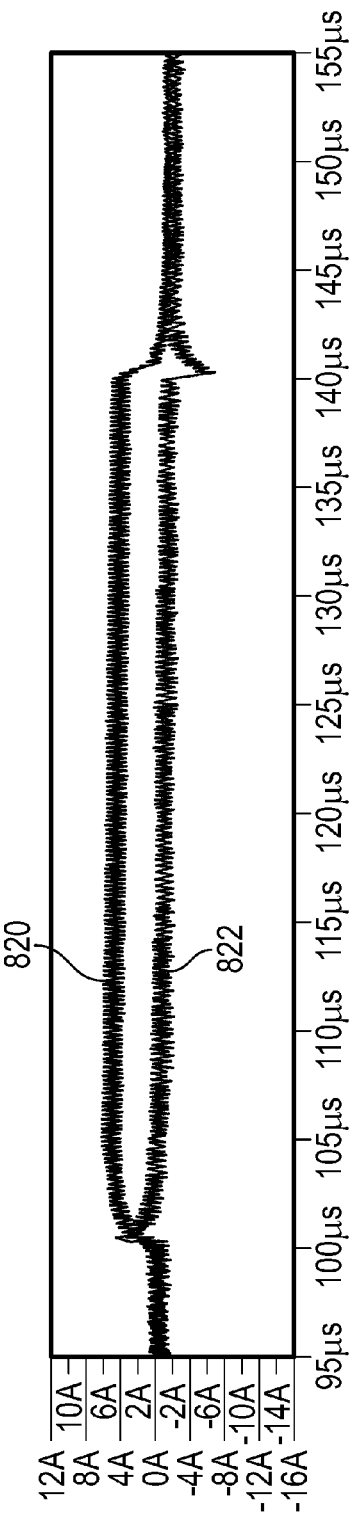

FIGS. 8A-8C illustrate exemplary load transient simulation waveforms for the simulation circuit 700 shown in FIG. 7. FIG. 8A illustrates the transient control signal ITH 810, the higher frequency component ITH$_{DC}$ 814 of the transient control signal ITH 810, and the lower frequency component ITH$_{DC}$ 812 of the transient control signal ITH 810. As shown, the transient control signal ITH 810 is a summation of the higher frequency component ITH$_{AC}$ 814 and the lower frequency component ITH$_{DC}$ 812.

The higher frequency component ITH$_{DC}$ 814 is only present during sudden increase or decrease in the output current. In this case, the higher frequency component ITH$_{AC}$ 814 is only present during the positive edge and the negative edge of the load step shown in FIG. 8B. The lower frequency component ITH$_{DC}$ 812 may also be changed during the sudden increase or decrease in the output current. However, once the new current threshold is reached due to the transient, the lower frequency component of current in steady state may follow the lower frequency component ITH$_{DC}$ 812. As such, the lower frequency component ITH$_{DC}$ 812 is not show to fade away after the transient ends. To this end, the higher frequency component ITH$_{DC}$ 814 may rise quickly in response to positive edge of the load step shown in FIG. 8B and once it reaches a specific threshold level, it may fade away quickly. In contrast, the lower frequency component ITH$_{DC}$ 812 may raise slowly in response to the positive edge of the load step shown in FIG. 8B and once it reaches a specific threshold level, it may remain there for the duration of the load step. Similarly, the higher frequency component $ITH_{DC}$ 814 may fall quickly in response to negative edge of the load step shown in FIG. 8B. In contrast, the lower frequency component $ITH_{DC}$ 812 may fall slowly in response to the negative edge of the load step shown in FIG. 8B.

FIG. 8B illustrates a current load step 816 and the corresponding output voltage 818 in response to the current load step 816. As shown, the output voltage declines with the positive edge of the load step 816 and rises with a negative edge of the load step. The reason for this is because the voltage of capacitor reduces to supplement the inductor's slowly rising current to meet the increase in current demand from the load device. Similarly, the output capacitor is useful in sinking the current to meet the sudden decrease in current from the load device. Therefore, as shown, there is a slight voltage ripple at the output. However, this voltage ripple may be significantly reduced compared to the voltage ripple without compared to the conventional power supply system not employing the teachings of the instant application. In one specific example, the output voltage ripple may be reduced by approximately 50%. This may be accomplished without a need for a complicated control method or employing an additional AC capacitor between the output terminal and the control loop for the auxiliary switching converter. The AC capacitor is configured to prevent DC or low frequency current from entering the control loop for auxiliary switching converter. The AC capacitor can add to the cost and size of the power supply system. Instead, the power supply system of the instant application as described with respect to FIG. 4 may prevent the DC or low frequency current from entering the auxiliary switching converter via a filtering network that is configured to filter out the lower frequency component of the transient signal ITH.

FIG. 8C illustrates a lower frequency inductor $iL_{DC}$ current 820 provided by the main switching converter in response to the lower frequency component $ITH_{DC}$ 812 and a higher frequency inductor $iL_{AC}$ current 822 provided by the auxiliary switching converter in response to the higher frequency component $ITH_{AC}$ 814. As shown, the higher frequency current 822 tracks the higher frequency component $ITH_{AC}$ 814 and the lower frequency current 820 tracks the lower frequency component $ITH_{DC}$ 812 and also track the lower frequency current in steady state operation. To this end, the auxiliary switching converter may only source or sink current during the transients (e.g., sources current in response to the positive edge of the load step and sinks current in response to the negative edge of the load step). In contrast, the main switching converter may source or sink current both during the transient and the steady state operation.

Figure 9A:
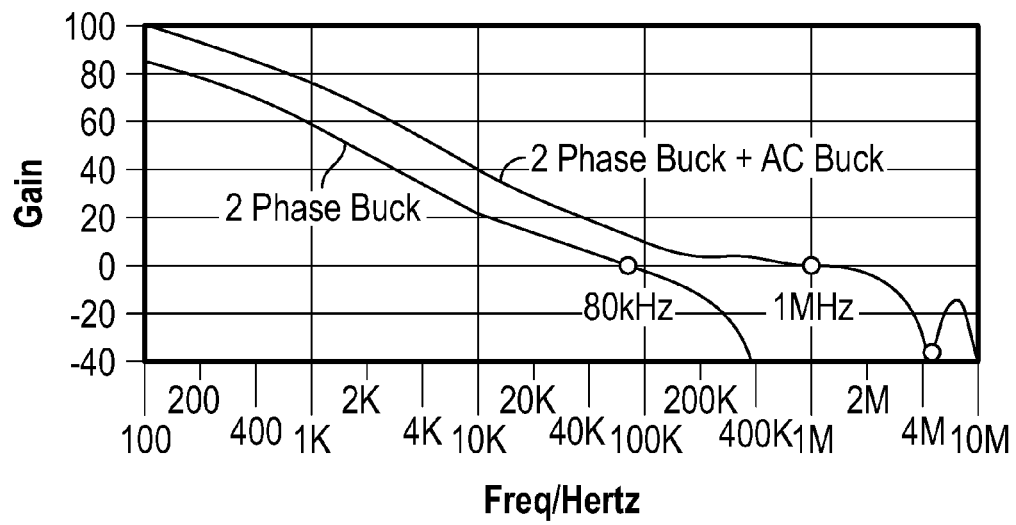
FIG. 9A illustrates a loop gain comparison between a first power supply system including two phase buck switching converters and a second power supply system including two phase buck switching converters in parallel with an auxiliary switching converter.

FIG. 9A illustrates a loop gain comparison between a first power supply system including two phase buck switching converters and a second power supply system including two phase buck switching converters in parallel with an auxiliary switching converter. As can be seen, with the addition of the auxiliary switching converter, the bandwidth of the second power supply system can be pushed from 80 kHz to 1 MHz. This is why a faster transient is possible. Usually the power supply system is stable when phase margin is greater than zero. In one implementation, it may be desirable to have 40-45 degrees phase.

Figure 9B:
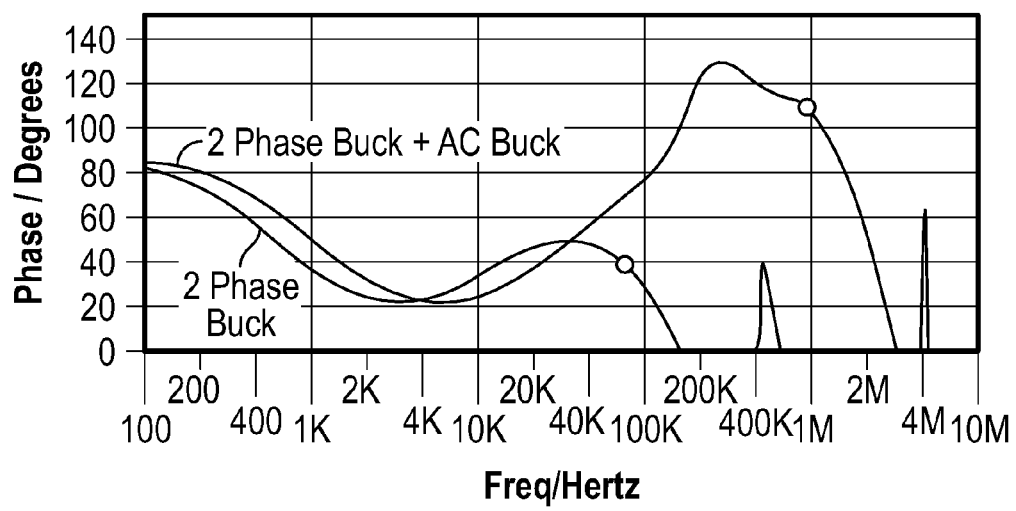
FIG. 9B illustrates phase margins for the first power supply system and the second power supply system of FIG. 9A.

FIG. 9B illustrates phase margin for the first power supply system and the second power supply system of FIG. 9A. As can be seen the phase margin of the first power supply system using only two phase buck switching converters at 100 kHz is about 40 degrees. In contrast, the phase margin of the second power supply system is substantially higher, higher than 60 degrees at 100 kHz.

Figure 10:
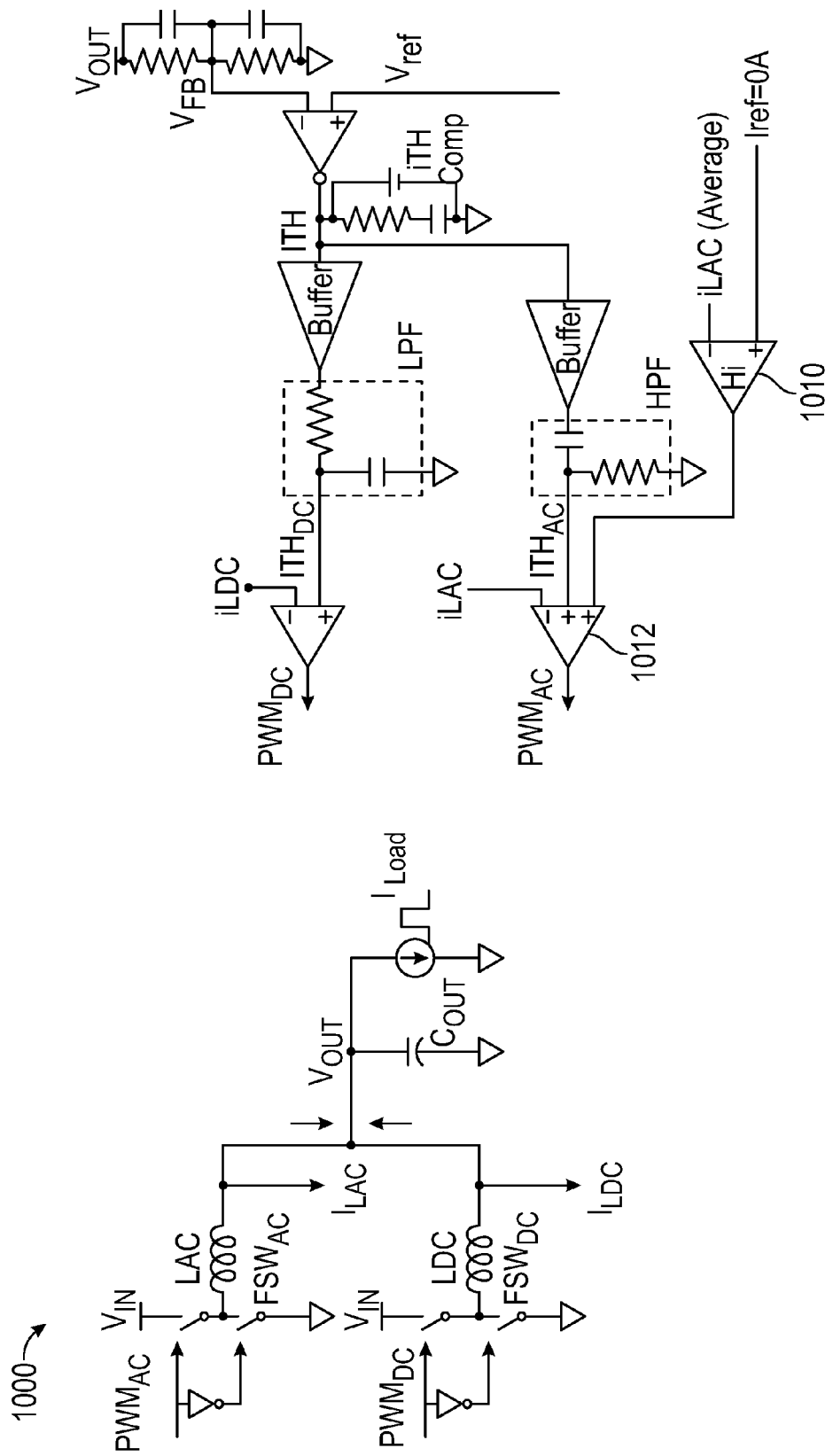
FIG. 10 illustrates another exemplary power supply system.

FIG. 10 illustrates another exemplary power supply system 1000. The power supply system 1000 is similar to the power supply system 500 except it includes an optional error amplifier 1010 to further ensure that the higher frequency inductor $iL_{AC}$ current generated by the auxiliary switching converter has zero average current in steady state. To this end, the additional error amplifier 1010 receives the average high frequency current $iL_{AC}$ sourced from the auxiliary switching converter at its inverting terminal and the 0 A Tref at its non-inverting terminal. The error amplifier output provides an offset signal to current comparator 1012 to form a slow loop and ensure inductor $iL_{AC}$ current has 0 A DC average value. The comparator 1012 also receives the sensed current $iL_{AC}$ and the higher frequency component of the transient signal ITH. The higher frequency component of the transient signal ITH is added to the offset signal and compared with the sensed current $iL_{AC}$. The comparator 1012 uses these input to generate a PWM signal for driving the auxiliary switching converter.

In another implementation, the power supply system may include two separate and independent control mechanisms. The two separate independent control mechanisms may include a first control mechanism for driving a main switching converter and a second and separate control mechanism for driving the auxiliary switching converter. This design may be useful if the main switching converter is part of a power module, which does not provide an interconnection pin to share its control mechanism with the auxiliary switching converter to enable a faster transient response. To enable the faster transient response, an auxiliary power interface device may be combined with this power module without changing the main switching converter. The power interface device may include a control mechanism and an auxiliary switching converter. The control mechanism is configured to receive the sensed Vout and the low frequency average Vout signal generated through a low pass filter, and detect the higher frequency compensation component of the Vout and run the auxiliary switching converter based on the higher frequency compensation component of the Vout.

Figure 11:
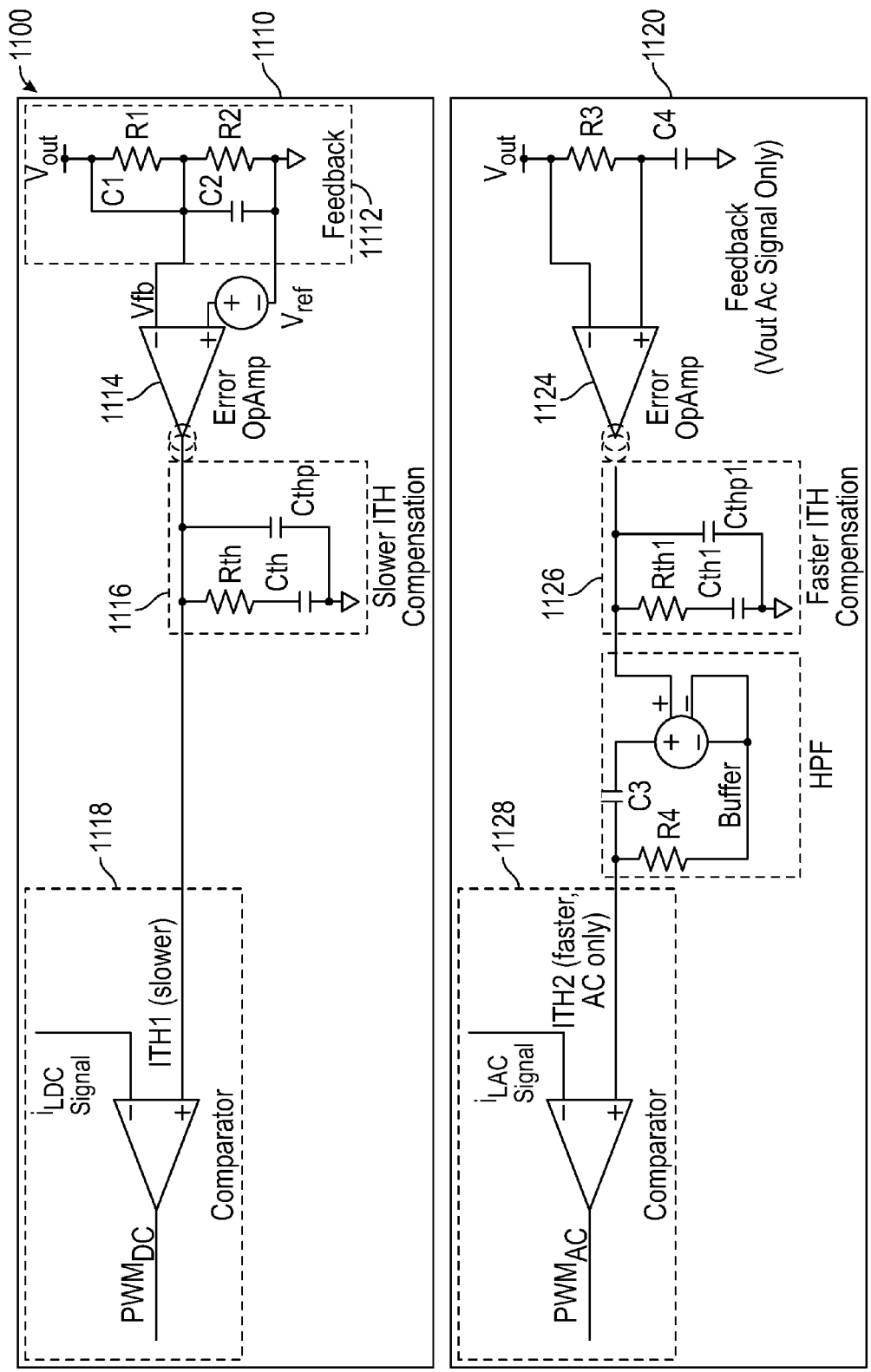
FIG. 11 illustrates an exemplary simulation circuit including two independent control mechanisms for a power supply system.

FIG. 11 illustrates an exemplary simulation circuit 1100 including two independent control mechanisms. The two independent control mechanisms include a main switching converter control mechanism 1110 and an auxiliary switching converter control mechanism 1120. The main switching converter control mechanism 1110 may be part of a power module that does not provide an interconnection for sharing the main switching control mechanism 1110 with an auxiliary switching converter.

The main switching converter control mechanism 1110 includes a feedback voltage sense circuit 1112, an error amplifier 1114, a compensation circuit 1116, and a driver circuit 1118. The feedback voltage sense circuit 1112 is connected at one end to the Vout and at the other end to the error amplifier 1114. The feedback voltage sense circuit 1112 is configured to sense the Vout through a network of resistors and capacitors including R1, R2, C1, and C2. The network of resistors R1 and R2 form a resistor divider and scale the signal Vout to make it proportional to Vref. The optional capacitors C1 and C2 are provided to make the divider frequency dependent. This frequency dependent divided Vout may be referred to as feedback voltage Vfb. The feedback voltage Vfb and a reference voltage Vref are input to the error amplifier gm (shown as a trans-conductance (gm) amplifier) 1114. The error amplifier 1114 may be either a current-output type transconductance amplifier or voltage-output type amplifier.

The error amplifier 1114 monitors the feedback voltage Vfb that is proportional to Vout at its inverting input and a reference voltage Vref at its non-inverting input. The feedback voltage Vfb should be approximately equal to the reference voltage Vref. When these two voltages are not equal, the amplifier 1114 may provide a transient control signal at its output. The frequency compensation circuit 1116 includes capacitors and resistors to provide frequency compensation for the feedback loop. The frequency compensation circuit 1116 may attenuate the higher frequency component of the transient signal and output the lower frequency transient signal. The lower frequency transient signal is provided to the driver circuit 1118.

The driver circuit 1118 includes a comparator. The comparator receives at its inverting input the sensed current $i_{LDC}$ in the inductor of the main switching converter and at its non-inverting input the lower frequency transient signal. The lower frequency transient signal is compared with the sensed current $i_{LDC}$ in the inductor (low frequency inductor current) to generate the PWM signal for driving the main switching converter.

The auxiliary switching converter control mechanism 1120 includes a feedback sense circuit, an error amplifier 1124, a compensation circuit 1126, a buffer, a high pass filter ("HPF"), and a driver circuit 1128. The feedback sense circuit at one end is connected to the Vout and at another end is connected to the error amplifier 1124. The feedback sense circuit includes a low pass filter. The low pass filter is configured to output the lower frequency average Vout signal. The sensed Vout is directly coupled to the inverting terminal of the error amplifier 1124 and the lower frequency average Vout signal is coupled to the non-inverting terminal of the error amplifier 1124.

The sensed Vout should be approximately equal to its lower frequency average Vout signal during the steady-state operation. When these two voltages are not equal, the amplifier 1124 may provide a higher frequency compensation component of the Vout at its output. The frequency compensation circuit 1126 includes capacitors and resistors to provide frequency compensation for the feedback loop. The frequency compensation circuit 1126 may enhance the higher frequency compensation component of the Vout and output the higher frequency compensation component of the Vout to the buffer and then to the HPF. The buffer may be configured to provide electrical impedance transformation from the compensation circuit 1126 to the second driver circuit 1128. The higher frequency compensation component of the Vout may then pass through the HPF to ensure it does not contain a lower frequency compensation component before being provided to the driver circuit 1128. The higher frequency compensation component of the Vout is then provided to the non-inverting terminal of the comparator and compared with the sensed current $i_{LAC}$ in the inductor (high frequency inductor current) of the auxiliary switching converter to generate a PWM signal for driving the auxiliary switching converter.

In one specific example, Vin may be 12V, Vout may be 1V, the current load step may be 25 A, the switching frequency of the main switching converter may be 500 kHz, the switching frequency of the auxiliary switching converter may be 5 MHz, the inductance of the inductors in the main switching converter may be 220 nH, and the inductance of the inductor in the auxiliary switching converter may be 20 nH.

In one implementation, the main switching converter and the auxiliary switching converter along with their respective control mechanisms can be provided in two separate integrated circuits. In another implementation, the main switching converter and the auxiliary switching converter along with their respective control mechanisms may be provided in a single integrated circuit. In another implementation, the main switching converter and the auxiliary switching converter may be provided in a single integrated circuit and the control mechanisms may be provided in a separate integrated circuit. In yet another implementation, the main switching converter along with its control mechanism may be provided in one integrated circuit and the auxiliary switching converter along with its control mechanism may be provided in another integrated circuit.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A power interface device comprising:
a main switching converter coupled to an input terminal and an output terminal and configured to operate at a first switching frequency to source a low frequency current from the input terminal to the output terminal;
an auxiliary switching converter coupled to the input terminal and the output terminal in parallel with the main switching converter and configured to operate at a second and higher switching frequency than the first switching frequency to source a fast transient high frequency current from the input terminal to the output terminal;
a feedback sense circuit configured to sense an output voltage at the output terminal;
an error amplifier configured to receive the sensed output voltage and a reference voltage and output a transient signal based on the sensed output voltage and the reference voltage;
a high pass filter configured to receive the transient signal and output a higher frequency component of the transient signal; and
an auxiliary driver circuit configured to drive the auxiliary switching converter based on the higher frequency component of the transient signal.

2. The power interface device of claim 1, wherein the main switching converter and the auxiliary switching converter include current-mode switching regulators.

3. The power interface device of claim 1, wherein the main switching converter and the auxiliary switching converter include step-down, current mode, switching regulators configured to convert a higher input voltage of the input terminal to a lower voltage, the lower voltage being the output voltage.

4. The power interface device of claim 1, wherein the main switching converter includes a first main switch, a second main switch, and a main inductor, wherein the first main switch at one end is coupled to the input voltage terminal and at another end is coupled to a main node, the second main switch at one end is coupled to the main node and at another end is coupled to a ground terminal, and the main inductor at one end is coupled to the main node and at another end is coupled to the output terminal.

5. The power interface device of claim 4, wherein the auxiliary switching converter includes a first auxiliary switch, a second auxiliary switch, and an auxiliary inductor, wherein the first auxiliary switch at one end is coupled to the input terminal and at another end is coupled to an auxiliary node, the second auxiliary switch at one end is coupled to the auxiliary node and another end is coupled to the ground terminal, and the auxiliary inductor at one end is coupled to the auxiliary node and at another end is coupled to the output terminal.

6. The power interface device of claim 5, wherein:
the auxiliary switching regulator is configured to source the fast transient high frequency current only during a transient detected at a load device, and
the transient includes a sudden increase or decrease in load current.

7. The power interface device of claim 5, wherein the first and second main switches and the first and second auxiliary switches include FET switches.

8. The power interface device of claim 1, wherein:
the feedback sense circuit includes a plurality of resistors and capacitors configured to sense the output voltage and generate a feedback voltage, and
the error amplifier is configured to receive the feedback voltage and the reference voltage, and generate the transient signal when the feedback voltage and the reference voltage are not substantially equal to each other.

9. The power interface device of claim 8, further comprising:
a low pass filter configured to receive the transient signal and output a lower frequency component of the transient signal; and
a main driver circuit configured to drive the main switching converter based on the lower frequency component of the transient signal.

10. The power interface device of claim 9, wherein:
the auxiliary driver circuit includes an auxiliary comparator configured to compare the higher frequency component of the transient signal with a sensed high frequency current sourced by the auxiliary switching converter and generate an auxiliary pulse-width signal for driving the auxiliary switching converter, and
the auxiliary pulse-width signal enables the auxiliary switching converter to source high frequency current tracking the higher frequency component of the transient signal to the output terminal.

11. The power interface device of claim 10, wherein:
the main driver circuit includes a main comparator circuit configured to compare the lower frequency component of the transient signal with a sensed low frequency current sourced by the main switching converter and generate a main pulse-width signal for driving the main switching converter, and
the main pulse-width signal enables the main switching converter to source the low frequency current tracking the lower frequency component of the transient signal to the output terminal.

12. The power interface device of claim 10, wherein in response to the first duty-cycle, the auxiliary switching converter is configured to source the fast transient high frequency current to the output terminal only during a transient sensed at a load device via the feedback sense circuit.

13. The power interface device of claim 12, wherein the auxiliary switching converter is configured to source substantially zero current during a steady-state operation of the load device.

14. A power interface device comprising:
a main switching converter coupled to an input terminal and an output terminal and configured to operate at a first switching frequency to source a low frequency current from the input terminal to the output terminal;

an auxiliary switching converter coupled to the input terminal and the output terminal in parallel with the main switching converter and configured to operate at a second and higher switching frequency than the first switching frequency to source a fast transient high frequency current from the input terminal to the output terminal;

a main control loop configured to drive the main switching converter to source the low frequency current from the input terminal to the output terminal; and an auxiliary control loop being independent form the main control loop and configured to drive the auxiliary switching converter to source the fast transient high frequency current from the input terminal to the output terminal during a transient, wherein:

the auxiliary control loop includes a high pass filter configured to output a higher frequency compensation component of an output voltage associated with the transient, and the auxiliary control loop is configured to drive the auxiliary switching converter based on the higher frequency compensation component of the output voltage.

15. The power interface device 14, wherein the main control loop includes:

a main feedback sense circuit having a plurality of resistors and capacitors configured to sense the output voltage and generate a feedback voltage, a main error operational amplifier configured to receive the feedback voltage and a reference voltage, and generate a transient signal when the feedback voltage and the reference voltage are not substantially equal to each other, and a main comparator circuit configured to compare the transient signal with a sensed low frequency current sourced by the main switching converter and generate a main pulse-width signal for driving the main switching converter, wherein the main pulse-width signal enables the main switching converter to source the low frequency current tracking the transient signal.

16. The power interface device 14, wherein the auxiliary control loop includes:

an auxiliary feedback sense circuit including a low pass filter coupled to the output terminal and configured to generate a lower frequency compensation component of the output voltage, an auxiliary error operational amplifier configured to directly receive the output voltage and the lower frequency compensation component of the output voltage, generate the higher frequency compensation component of the output voltage, and supply the higher frequency compensation component of the output voltage to the high pass filter, an auxiliary comparator circuit configured to compare the higher frequency compensation component of the output voltage with a sensed high frequency current sourced by the auxiliary switching converter and generate an auxiliary pulse-width signal for driving the auxiliary switching converter, and the auxiliary pulse-width signal enables the auxiliary switching converter to source the fast transient high frequency current tracking the higher frequency compensation component of the output voltage to the output terminal.

17. A power interface device comprising:

a main switching converter coupled to an input terminal and an output terminal and configured to operate at a first switching frequency to source a low frequency current from the input terminal to the output terminal;

an auxiliary switching converter coupled to the input terminal and the output terminal in parallel with the main switching converter and configured to operate at a second and higher switching frequency than the first switching frequency to source a fast transient high frequency current from the input terminal to the output terminal;

a feedback sense circuit configured to sense an output voltage at the output terminal;

an error amplifier configured to receive the sensed output voltage and a reference voltage and output a transient signal based on the sensed output voltage and the reference voltage;

a low pass filter configured to receive the transient signal and output a lower frequency component of the transient signal;

a high pass filter configured to receive the transient signal and output a higher frequency component of the transient signal;

a main driver circuit configured to drive the auxiliary switching converter based on the lower frequency component of the transient signal; and an auxiliary driver circuit configured to drive the auxiliary switching converter based on the higher frequency component of the transient signal.

18. The power interface device of claim 17, wherein the main switching converter and the auxiliary switching converter include step-down, current mode, switching regulators configured to convert a higher input voltage of the input terminal to a lower voltage, the lower voltage being the output voltage.

19. The power interface device of claim 17, wherein the main switching converter includes a first main switch, a second main switch, and a main inductor, wherein the first main switch at one end is coupled to the input voltage terminal and at another end is coupled to a main node, the second main switch at one end is coupled to the main node and at another end is coupled to a ground terminal, and the main inductor at one end is coupled to the main node and at another end is coupled to the output terminal.

20. The power interface device of claim 19, wherein the auxiliary switching converter includes a first auxiliary switch, a second auxiliary switch, and an auxiliary inductor, wherein the first auxiliary switch at one end is coupled to the input terminal and at another end is coupled to an auxiliary node, the second auxiliary switch at one end is coupled to the auxiliary node and at another end is coupled to the ground terminal, and the auxiliary inductor at one end is coupled to the auxiliary node and at another end is coupled to the output terminal.

* * * * *